(12) United States Patent
Ding

(10) Patent No.: US 11,947,080 B2
(45) Date of Patent: Apr. 2, 2024

(54) CAMERA OPTICAL LENS

(71) Applicant: Changzhou Raytech Optronics Co., Ltd., Changzhou (CN)

(72) Inventor: Shujian Ding, Shenzhen (CN)

(73) Assignee: Changzhou Raytech Optronics Co., Ltd., Changzhou (CN)

( * ) Notice: Subject to any disclaimer, the term of this patent is extended or adjusted under 35 U.S.C. 154(b) by 638 days.

(21) Appl. No.: 17/134,188

(22) Filed: Dec. 25, 2020

(65) Prior Publication Data

US 2022/0035134 A1   Feb. 3, 2022

(30) Foreign Application Priority Data

Jul. 28, 2020   (CN) .......................... 202010733760.9

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
CPC ... G02B 9/64; G02B 13/0045; G02B 27/0025
USPC ........................................................ 359/708
See application file for complete search history.

(56) References Cited

U.S. PATENT DOCUMENTS

| 2020/0103619 A1* | 4/2020 | Heu | ................... G02B 27/0025 |
| 2020/0209560 A1* | 7/2020 | Zhao | ..................... G02B 27/005 |
| 2022/0206269 A1* | 6/2022 | Nitta | ......................... G02B 9/64 |

* cited by examiner

*Primary Examiner* — Stephone B Allen
*Assistant Examiner* — Leonidas Boutsikaris
(74) *Attorney, Agent, or Firm* — W&G Law Group

(57) ABSTRACT

An camera optical lens includes, from an object side to an image side, a first lens having a positive refractive power, a second lens having a negative refractive power, a third lens having a negative refractive power, a fourth lens having a positive refractive power, a fifth lens, a sixth lens having a positive refractive power, and a seventh lens having a negative refractive power, and satisfies following conditions: $59.00 \leq v1 \leq 82.00$; and $3.00 \leq R12/R11 \leq 10.00$, where v1 denotes an abbe number of the first lens; R11 denotes a central curvature radius of an object side surface of the sixth lens; and R12 denotes a central curvature radius of an image side surface of the sixth lens. The camera optical lens satisfies requirements of ultra-thinness, a wide angle, and a large aperture while achieving good optical performance.

11 Claims, 9 Drawing Sheets

CAMERA OPTICAL LENS

TECHNICAL FIELD

The present invention relates to the field of optical lens, and more particularly, to a camera optical lens suitable for handheld terminal devices such as smart phones or digital cameras and camera devices such as monitors or PC lenses.

BACKGROUND

In recent years, with the popularity of smart phones, the demand for a miniaturized camera lens has increased. The photosensitive devices of a conventional camera lens are nothing more than charge coupled devices (CCD) or complementary metal-oxide semiconductor devices (CMOS Sensor). With the advancement of semiconductor manufacturing technology, the pixel size of the photosensitive device has become smaller and smaller, and nowadays electronic products are developing with good functions and thin and small appearance. Therefore, the miniaturized camera lens with good imaging quality has become the mainstream in the current market.

In order to obtain better imaging quality, the lens that is traditionally mounted in mobile phone cameras adopts a three-lens or four-lens structure. Also, with the development of technology and the increase of the diverse demands of users, and as the pixel area of photosensitive devices is becoming smaller and smaller and the requirement of the system on the imaging quality is improving constantly, a five-lens, six-lens, or seven-lens structure gradually appears in lens designs. Although the common seven-lens structure already has good optical performance, its settings on refractive power, lens spacing and lens shape still have some irrationality, which results in that the lens structure cannot achieve a high optical performance while satisfying design requirements for ultra-thinness, a wide angle and a large aperture.

SUMMARY

In view of the problems, the present invention aims to provide a camera lens, which can satisfy design requirements for ultra-thinness, a wide angle and a large aperture while achieving good optical performance.

In an embodiment, the present invention provides a camera optical lens. The camera optical lens includes, from an object side to an image side, a first lens having a positive refractive power; a second lens having a negative refractive power; a third lens having a negative refractive power; a fourth lens having a positive refractive power; a fifth lens; a sixth lens having a positive refractive power; and a seventh lens having a negative refractive power, and satisfies following conditions: $59.00 \le v1 \le 82.00$; and $3.00 \le R12/R11 \le 10.00$, where v1 denotes an abbe number of the first lens; R11 denotes a central curvature radius of an object side surface of the sixth lens; and R12 denotes a central curvature radius of an image side surface of the sixth lens.

In an improved embodiment, the camera optical lens further satisfies a following condition: $1.20 \le d4/d5 \le 5.00$, where d4 denotes an on-axis distance from an image side surface of the second lens to an object side surface of the third lens, and d5 denotes an on-axis thickness of the third lens.

In an improved embodiment, the camera optical lens further satisfies a following condition: $1.50 \le f4/f \le 6.00$, where f denotes a focal length of the camera optical lens, and f4 denotes a focal length of fourth lens.

In an improved embodiment, the camera optical lens further satisfies following conditions: $0.58 \le f1/f \le 1.88$; $-4.16 \le (R1+R2)/(R1-R2) \le -0.85$; and $0.07 \le d1/TTL \le 0.23$, where f denotes a focal length of the camera optical lens, f1 denotes a focal length of the first lens, R1 denotes a central curvature radius of an object side surface of the first lens, R2 denotes a central curvature radius of an image side surface of the first lens, d1 denotes an on-axis thickness of the first lens, and TTL denotes a total optical length from the object side surface of the first lens to an image plane of the camera optical lens along an optic axis.

In an improved embodiment, the camera optical lens further satisfies following conditions: $-20.22 \le f2/f \le -4.09$; $4.11 \le (R3+R4)/(R3-R4) \le 15.97$; and $0.02 \le d3/TTL \le 0.07$, where f denotes a focal length of the camera optical lens, f2 denotes a focal length of the second lens, R3 denotes a central curvature radius of an object side surface of the second lens, R4 denotes a central curvature radius of an image side surface of the second lens, d3 denotes an on-axis thickness of the second lens, and TTL denotes a total optical length from an object side surface of the first lens to an image plane of the camera optical lens along an optic axis.

In an improved embodiment, the camera optical lens further satisfies following conditions: $-10.34 \le f3/f \le -2.41$; $1.00 \le (R5+R6)/(R5-R6) \le 4.05$; and $0.01 \le d5/TTL \le 0.09$, where f denotes a focal length of the camera optical lens, f3 denotes a focal length of the third lens, R5 denotes a central curvature radius of an object side surface of the third lens, R6 denotes a central curvature radius of an image side surface of the third lens, d5 denotes an on-axis thickness of the third lens, and TTL denotes a total optical length from an object side surface of the first lens to an image plane of the camera optical lens along an optic axis.

In an improved embodiment, the camera optical lens further satisfies following conditions: $-0.16 \le (R7+R8)/(R7-R8) \le 1.44$; and $0.05 \le d7/TTL \le 0.17$, where R7 denotes a central curvature radius of an object side surface of the fourth lens, R8 denotes a central curvature radius of an image side surface of the fourth lens, d7 denotes an on-axis thickness of the fourth lens, and TTL denotes a total optical length from an object side surface of the first lens to an image plane of the camera optical lens along an optic axis.

In an improved embodiment, the camera optical lens further satisfies following conditions: $-8.08 \le f5/f \le 45309.56$; $1.48 \le (R9+R10)/(R9-R10) \le 238.85$; and $0.02 \le d9/TTL \le 0.11$, where f denotes a focal length of the camera optical lens, f5 denotes a focal length of the fifth lens, R9 denotes a central curvature radius of an object side surface of the fifth lens, R10 denotes a central curvature radius of an image side surface of the fifth lens, d9 denotes an on-axis thickness of the fifth lens, and TTL denotes a total optical length from an object side surface of the first lens to an image plane of the camera optical lens along an optic axis.

In an improved embodiment, the camera optical lens further satisfies following conditions: $0.42 \le f6/f \le 4.01$; $-3.98 \le (R11+R12)/(R11-R12) \le -0.81$; and $0.04 \le d11/TTL \le 0.15$, where f denotes a focal length of the camera optical lens, f6 denotes a focal length of the sixth lens, d11 denotes an on-axis thickness of the sixth lens, and TTL denotes a total optical length from an object side surface of the first lens to an image plane of the camera optical lens along an optic axis.

In an improved embodiment, the camera optical lens further satisfies following conditions: $-2.02 \le f7/f \le -0.49$; $0.04 \le (R13+R14)/(R13-R14) \le 0.56$; and $0.01 \le d13/$ TTL≤0.13, where f denotes a focal length of the camera optical lens, f7 denotes a focal length of the seventh lens, R13 denotes a central curvature radius of an object side surface of the seventh lens, R14 denotes a central curvature radius of an image side surface of the seventh lens, d13 denotes an on-axis thickness of the seventh lens, and TTL denotes a total optical length from an object side surface of the first lens to an image plane of the camera optical lens along an optic axis.

In an improved embodiment, the first lens is made of a glass material.

The present invention has at least the following beneficial effects: the camera optical lens provided by the present invention has good optical performance while having the characteristics of ultra-thinness, a wide angle and a large aperture, and is especially suitable for camera lens assembly of mobile phones and WEB camera lenses formed by imaging elements such as CCD and CMOS for high pixels.

BRIEF DESCRIPTION OF DRAWINGS

Many aspects of the exemplary embodiment can be better understood with reference to the following drawings. The components in the drawings are not necessarily drawn to scale, the emphasis instead being placed upon clearly illustrating the principles of the present invention. Moreover, in the drawings, like reference numerals designate corresponding parts throughout the several views.

DESCRIPTION OF EMBODIMENTS

The present invention will hereinafter be described in detail with reference to several exemplary embodiments. To make the technical problems to be solved, technical solutions and beneficial effects of the present invention more apparent, the present invention is described in further detail together with the figure and the embodiments. It should be understood the specific embodiments described hereby is only to explain the invention, not intended to limit the invention.

Embodiment 1

Figure 1:
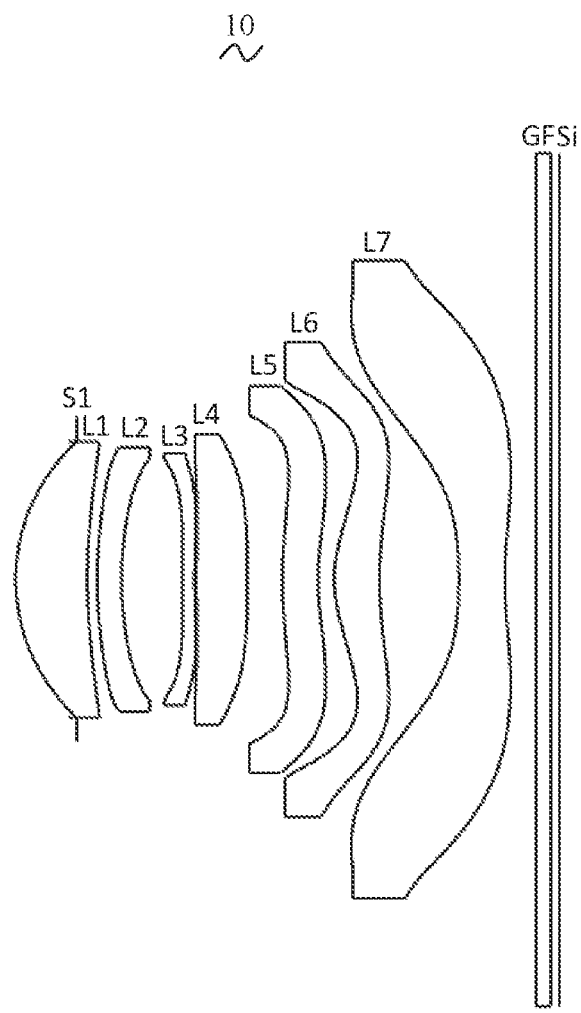
FIG. 1 is a schematic structural diagram of a camera optical lens in accordance with Embodiment 1 of the present invention.

Referring to FIG. 1, the present invention provides a camera optical lens 10. FIG. 1 shows the camera optical lens 10 according to Embodiment 1 of the present invention. The camera optical lens 10 includes 7 lenses. Specifically, the camera optical lens 10 includes, from an object side to an image side, an aperture S1, a first lens L1, a second lens L2, a third lens L3, a fourth lens L4, a fifth lens L5, a sixth lens L6, and a seventh lens L7. An optical element such as an optical filter (GF) can be arranged between the seventh lens L7 and an image plane Si.

In this embodiment, the first lens L1 has a positive refractive power, the second lens L2 has a negative refractive power, the third lens L3 has a negative refractive power, the fourth lens L4 has a positive refractive power, the fifth lens L5 has a negative refractive power, the sixth lens L6 has a positive refractive power, and the seventh lens L7 has a negative refractive power.

The first lens L1 is made of a glass material, the second lens L2 is made of a plastic material, the third lens L3 is made of a plastic material, the fourth lens L4 is made of a plastic material, the fifth lens L5 is made of a plastic material, the sixth lens L6 is made of a plastic material, and the seventh lens L7 is made of a plastic material. In other embodiments, the lenses may be made of other materials.

An abbe number of the first lens L1 is defined as v1. The camera optical lens 10 satisfies a condition: 59.00≤v1≤82.00, which specifies the abbe number v1 of the first lens L1. This condition is beneficial for correction of color aberration.

A central curvature radius of an object side surface of the sixth lens L6 is defined as R11, and a central curvature radius of an image side surface of the sixth lens L6 is defined as R12. The camera optical lens 10 further satisfies a condition: 3.00≤R12/R11≤10.00, which specifies a shape of the sixth lens L6. This condition can alleviate deflection of light passing through the lens while effectively reducing aberrations.

An on-axis distance from the image side surface of the second lens L2 to the object side surface of the third lens L3 is defined as d4, and an on-axis thickness of the third lens L3 is defined as d5. The camera optical lens 10 further satisfies a condition: 1.20≤d4/d5≤5.00. When d4/d5 satisfies the condition, it facilitates lens processing and lens installation.

A focal length of the camera optical lens 10 is defined as f, and a focal length of the fourth lens L4 is defined as f4. The camera optical lens 10 further satisfies a condition: 1.50≤f4/f≤6.00, which specifies a ratio of the focal length of the fourth lens L4 to the focal length of the system. This condition can correct the aberration of the optical system, thereby improving the imaging quality.

In this embodiment, an object side surface of the first lens L1 is convex at a paraxial position and an image side surface of the first lens L1 is concave at a paraxial position.

The focal length of the camera optical lens 10 is defined as f, and a focal length of the first lens L1 is defined as f1. The camera optical lens 10 further satisfies a condition: 0.58≤f1/f≤1.88, which specifies a ratio of the focal length of the first lens L1 to the focal length f of the camera optical lens 10. When the condition is satisfied, the first lens L1 can have an appropriate positive refractive power, thereby facilitating reducing aberrations of the system while facilitating realizing ultra-thinness and a wide angle. As an example, $0.93 \leq f1/f \leq 1.50$.

A central curvature radius of the object side surface of the first lens L1 is defined as R1, and a central curvature radius of the image side surface of the first lens L1 is defined as R2. The camera optical lens 10 further satisfies a condition: $-4.16 \leq (R1+R2)/(R1-R2) \leq -0.85$. This can reasonably control a shape of the first lens L1, so that the first lens L1 can effectively correct spherical aberrations of the system. As an example, $-2.60 \leq (R1+R2)/(R1-R2) \leq -1.06$.

An on-axis thickness of the first lens L1 is defined as d1, and a total optical length from the object side surface of the first lens L1 to an image plane of the camera optical lens 10 along an optic axis is defined as TTL. The camera optical lens 10 further satisfies a condition: $0.07 \leq d1/TTL \leq 0.23$. This can facilitate achieving an ultra-thin lens. As an example, $0.10 \leq d1/TTL \leq 0.19$.

An object side surface of the second lens L2 is convex at a paraxial position and an image side surface of the second lens L2 is concave at a paraxial position.

The focal length of the camera optical lens 10 is defined as f, and a focal length of the second lens L2 is defined as f2. The camera optical lens 10 further satisfies a condition: $-20.22 \leq f2/f \leq -4.09$. By controlling the negative refractive power of the second lens L2 within a reasonable range, it facilitates correction of aberrations of the optical system. As an example, $-12.64 \leq f2/f \leq -5.11$.

A central curvature radius of the object side surface of the second lens L2 is defined as R3, and a central curvature radius of the image side surface of the second lens L2 is defined as R4. The camera optical lens 10 further satisfies a condition: $4.11 \leq (R3+R4)/(R3-R4) \leq 15.97$, which specifies a shape of the second lens L2. This can facilitate correction of an on-axis aberration with the development towards ultra-thinness and a wide angle. As an example, $6.58 \leq (R3+R4)/(R3-R4) \leq 12.78$.

An on-axis thickness of the second lens L2 is defined as d3, and the total optical length from the object side surface of the first lens L1 to the image plane of the camera optical lens 10 along an optic axis is defined as TTL. The camera optical lens 10 further satisfies a condition: $0.02 \leq d3/TTL \leq 0.07$. This can facilitate achieving ultra-thinness. As an example, $0.03 \leq d3/TTL \leq 0.05$.

An object side surface of the third lens L3 is convex at a paraxial position and an image side surface of the third lens L3 is concave at a paraxial position.

The focal length of the camera optical lens 10 is defined as f, and a focal length of the third lens L3 is defined as f3. The camera optical lens 10 further satisfies a condition: $-10.34 \leq f3/f \leq -2.41$. The appropriate allocation of the refractive power leads to better imaging quality and a lower sensitivity of the system. As an example, $-6.46 \leq f3/f \leq -3.01$.

A central curvature radius of the object side surface of the third lens L3 is defined as R5, and a central curvature radius of the image side surface of the third lens L3 is defined as R6. The camera optical lens 10 further satisfies a condition: $1.00 \leq (R5+R6)/(R5-R6) \leq 4.05$, which specifies a shape of the third lens L3. This condition can alleviate the deflection of light passing through the lens while effectively reducing aberrations. As an example, $1.60 \leq (R5+R6)/(R5-R6) \leq 3.24$.

An on-axis thickness of the third lens L3 is defined as d5, and the total optical length from the object side surface of the first lens L1 to the image plane of the camera optical lens 10 along an optic axis is defined as TTL. The camera optical lens 10 further satisfies a condition: $0.01 \leq d5/TTL \leq 0.09$. This can facilitate achieving ultra-thinness. As an example, $0.02 \leq d5/TTL \leq 0.07$.

An object side surface of the fourth lens L4 is convex at a paraxial position and an image side surface of the fourth lens L4 is convex at a paraxial position.

A central curvature radius of the object side surface of the fourth lens L4 is defined as R7, and a central curvature radius of the image side surface of the fourth lens L4 is defined as R8. The camera optical lens 10 further satisfies a condition: $-0.16 \leq (R7+R8)/(R7-R8) \leq 1.44$, which specifies a shape of the fourth lens L4. This can facilitate correction of an off-axis aberration with the development towards ultra-thinness and a wide angle. As an example, $-0.10 \leq (R7+R8)/(R7-R8) \leq 1.15$.

An on-axis thickness of the fourth lens L4 is defined as d7, and the total optical length from the object side surface of the first lens L1 to the image plane of the camera optical lens 10 along an optic axis is defined as TTL. The camera optical lens 10 further satisfies a condition: $0.05 \leq d7/TTL \leq 0.17$. This can facilitate achieving ultra-thinness. As an example, $0.07 \leq d7/TTL \leq 0.14$.

An object side surface of the fifth lens L5 is convex at a paraxial position and an image side surface of the fifth lens L5 is concave at a paraxial position.

The focal length of the camera optical lens 10 is defined as f, and a focal length of the fifth lens L5 is defined as f5. The camera optical lens 10 further satisfies a condition: $-8.08 \leq f5/f \leq 45309.56$. This condition can effectively make a light angle of the camera optical lens 10 gentle and reduce the tolerance sensitivity. As an example, $-5.05 \leq f5/f \leq 36247.65$.

A central curvature radius of the object side surface of the fifth lens L5 is defined as R9, and a central curvature radius of the image side surface of the fifth lens L5 is defined as R10. The camera optical lens 10 further satisfies a condition: $1.48 \leq (R9+R10)/(R9-R10) \leq 238.85$, which specifies a shape of the fifth lens L5. This can facilitate correction of an off-axis aberration with the development towards ultra-thinness and a wide angle. As an example, $2.37 \leq (R9+R10)/(R9-R10) \leq 191.08$.

An on-axis thickness of the fifth lens L5 is defined as d9, and the total optical length from the object side surface of the first lens L1 to the image plane of the camera optical lens 10 along an optic axis is defined as TTL. The camera optical lens 10 further satisfies a condition: $0.02 \leq d9/TTL \leq 0.11$. This can facilitate achieving ultra-thinness. As an example, $0.04 \leq d9/TTL \leq 0.09$.

An object side surface of the sixth lens L6 is convex at a paraxial position and an image side surface of the sixth lens L6 is concave at a paraxial position.

The focal length of the camera optical lens 10 is defined as f, and a focal length of the sixth lens L6 is defined as f6. The camera optical lens 10 further satisfies a condition: $0.42 \leq f6/f \leq 4.01$. The appropriate allocation of the refractive power leads to better imaging quality and a lower sensitivity of the system. As an example, $0.66 \leq f6/f \leq 3.21$.

A central curvature radius of the object side surface of the sixth lens L6 is defined as R11, and a central curvature radius of the image side surface of the sixth lens L6 is defined as R12. The camera optical lens 10 further satisfies a condition: $-3.98 \leq (R11+R12)/(R11-R12) \leq -0.81$, which specifies a shape of the sixth lens L6. This can facilitate correction of an off-axis aberration with the development towards ultra-thinness and a wide angle. As an example, $-2.48 \leq (R11+R12)/(R11-R12) \leq -1.02$.

An on-axis thickness of the sixth lens L6 is defined as d11, and the total optical length from the object side surface of the first lens L1 to the image plane of the camera optical lens 10 along an optic axis is defined as TTL. The camera optical lens 10 further satisfies a condition: 0.04≤d11/TTL≤0.15. This can facilitate achieving ultra-thin lenses. As an example, 0.06≤d11/TTL≤0.12.

An object side surface of the seventh lens L7 is concave at a paraxial position and an image side surface of the seventh lens L7 is concave at a paraxial position.

The focal length of the camera optical lens 10 is defined as f, and a focal length of the seventh lens L7 is defined as P. The camera optical lens 10 further satisfies a condition: −2.02≤f7/f≤−0.49. The appropriate allocation of the refractive power leads to better imaging quality and a lower sensitivity of the system. As an example, −1.26≤f7/f≤−0.62.

A central curvature radius of the object side surface of the seventh lens L7 is defined as R13, and a central curvature radius of the image side surface of the seventh lens L7 is defined as R14. The camera optical lens 10 further satisfies a condition: 0.04≤(R13+R14)/(R13−R14)≤0.56, which specifies a shape of the seventh lens L7. This can facilitate correction of an off-axis aberration with the development towards ultra-thinness and a wide angle. As an example, 0.06≤(R13+R14)/(R13−R14)≤0.45.

An on-axis thickness of the seventh lens L7 is defined as d13, and the total optical length from the object side surface of the first lens L1 to the image plane of the camera optical lens 10 along an optic axis is defined as TTL. The camera optical lens 10 further satisfies a condition: 0.01≤d13/TTL≤0.13. This can facilitate achieving ultra-thinness. As an example, 0.02≤d13/TTL≤0.10.

In this embodiment, an image height of the camera optical lens 10 is defined as IH, and the total optical length from the object side surface of the first lens L1 to the image plane of the camera optical lens 10 along an optic axis is defined as TTL. The camera optical lens 10 further satisfies a condition: TTL/IH≤1.40. This condition can facilitate achieving ultra-thinness.

In this embodiment, a field of view (FOV) of the camera optical lens 10 is greater than or equal to 80°, thereby achieving a wide angle.

In this embodiment, an F number (FNO) of the camera optical lens 10 is smaller than or equal to 1.50, thereby leading to a large aperture and good imaging performance.

In this embodiment, the focal length of the camera optical lens 10 is defined as f, and a combined focal length of the first lens L1 and the second lens L2 is defined as f12. The camera optical lens 10 further satisfies a condition: 0.65≤f12/f≤2.05. This can eliminate aberration and distortion of the camera optical lens 10, reduce a back focal length of the camera optical lens 10, and maintain miniaturization of the camera lens system group. As an example, 1.04≤f12/f≤1.64.

When the above conditions are satisfied, the camera optical lens 10 will have good optical performance while satisfying design requirements for ultra-thinness, a wide angle and a large apertures; with these characteristics of the camera optical lens 10, the camera optical lens 10 is especially suitable for camera optical lens assembly of mobile phones and WEB camera optical lenses formed by imaging elements such as CCD and CMOS for high pixels.

In the following, examples will be used to describe the camera optical lens 10 of the present invention. The symbols recorded in each example will be described as follows. The focal length, on-axis distance, central curvature radius, on-axis thickness, inflection point position, and stagnation point position are all expressed in unit of mm.

TTL: Total optical length (the total optical length from the object side surface of the first lens L1 to the image plane of the camera optical lens along the optic axis) in unit of mm.

F number (FNO): a ratio of an effective focal length of the camera optical lens to an entrance pupil diameter of the camera optical lens.

In an example, an inflection point and/or a stagnation point can be arranged on the object side surface and/or image side surface of the lenses, so as to satisfy the demand for the high imaging quality. The description below can be referred to for specific implementations.

Table 1 and Table 2 show design data of the camera optical lens 10 according to Embodiment 1 of the present invention.

TABLE 1

|     | R       | d     |        | nd     |     | vd    |
|-----|---------|-------|--------|--------|-----|-------|
| S1  | ∞       | d0=   | −0.873 |        |     |       |
| R1  | 2.950   | d1=   | 1.031  | nd1    | 1.5806 | v1 | 60.08 |
| R2  | 8.482   | d2=   | 0.143  |        |     |       |
| R3  | 6.624   | d3=   | 0.349  | nd2    | 1.6700 | v2 | 19.39 |
| R4  | 5.406   | d4=   | 0.875  |        |     |       |
| R5  | 35.203  | d5=   | 0.175  | nd3    | 1.6700 | v3 | 19.39 |
| R6  | 11.720  | d6=   | 0.031  |        |     |       |
| R7  | 21.776  | d7=   | 0.735  | nd4    | 1.5444 | v4 | 55.82 |
| R8  | −25.479 | d8=   | 0.503  |        |     |       |
| R9  | 6.937   | d9=   | 0.509  | nd5    | 1.6400 | v5 | 23.54 |
| R10 | 3.436   | d10=  | 0.236  |        |     |       |
| R11 | 2.000   | d11=  | 0.649  | nd6    | 1.5444 | v6 | 55.82 |
| R12 | 6.050   | d12=  | 1.143  |        |     |       |
| R13 | −8.838  | d13=  | 0.659  | nd7    | 1.5444 | v7 | 55.82 |
| R14 | 5.762   | d14=  | 0.453  |        |     |       |
| R15 | ∞       | d15=  | 0.210  | ndg    | 1.5168 | vg | 64.17 |
| R16 | ∞       | d16=  | 0.130  |        |     |       |

In the table, meanings of various symbols are defined as follows.
S1: aperture;
R: central curvature radius of an optical surface;
R1: central curvature radius of the object side surface of the first lens L1;
R2: central curvature radius of the image side surface of the first lens L1;
R3: central curvature radius of the object side surface of the second lens L2;
R4: central curvature radius of the image side surface of the second lens L2;
R5: central curvature radius of the object side surface of the third lens L3;
R6: central curvature radius of the image side surface of the third lens L3;
R7: central curvature radius of the object side surface of the fourth lens L4;
R8: central curvature radius of the image side surface of the fourth lens L4;
R9: central curvature radius of the object side surface of the fifth lens L5;
R10: central curvature radius of the image side surface of the fifth lens L5;
R11: central curvature radius of the object side surface of the sixth lens L6;
R12: central curvature radius of the image side surface of the sixth lens L6;
R13: central curvature radius of the object side surface of the sixth lens L7;
R14: central curvature radius of the image side surface of the sixth lens L7;
R15: central curvature radius of an object side surface of the optical filter GF;
R16: central curvature radius of an image side surface of the optical filter GF;
d: on-axis thickness of a lens, an on-axis distance between lenses;
d0: on-axis distance from the aperture S1 to the object side surface of the first lens L1;
d1: on-axis thickness of the first lens L1;
d2: on-axis distance from the image side surface of the first lens L1 to the object side surface of the second lens L2;
d3: on-axis thickness of the second lens L2;
d4: on-axis distance from the image side surface of the second lens L2 to the object side surface of the third lens L3;
d5: on-axis thickness of the third lens L3;
d6: on-axis distance from the image side surface of the third lens L3 to the object side surface of the fourth lens L4;
d7: on-axis thickness of the fourth lens L4;
d8: on-axis distance from the image side surface of the fourth lens L4 to the object side surface of the fifth lens L5;
d9: on-axis thickness of the fifth lens L5;
d10: on-axis distance from the image side surface of the fifth lens L5 to the object side surface of the sixth lens L6;
d11: on-axis thickness of the sixth lens L6;
d12: on-axis distance from the image side surface of the fifth lens L6 to the object side surface of the seventh lens L7;
d13: on-axis thickness of the seventh lens L7;
d14: on-axis distance from the image side surface of the seventh lens L7 to the object side surface of the optical filter GF;

TABLE 1-continued

| R | d | nd | vd |
|---|---|----|----| d15: on-axis thickness of the optical filter GF;
d16: on-axis distance from the image side surface of the optical filter GF to the image plane;
nd: refractive index of d line;
nd1: refractive index of d line of the first lens L1;
nd2: refractive index of d line of the second lens L2;
nd3: refractive index of d line of the third lens L3;
nd4: refractive index of d line of the fourth lens L4;
nd5: refractive index of d line of the fifth lens L5;
nd6: refractive index of d line of the sixth lens L6;
nd7: refractive index of d line of the seventh lens L7;
ndg: refractive index of d line of the optical filter GF;
vd: abbe number;
v1: abbe number of the first lens L1;
v2: abbe number of the second lens L2;
v3: abbe number of the third lens L3;
v4: abbe number of the fourth lens L4;
v5: abbe number of the fifth lens L5;
v6: abbe number of the sixth lens L6;
v7: abbe number of the seventh lens L7;
vg: abbe number of the optical filter GF.

Table 2 shows aspherical surface data of respective lenses in the camera optical lens 10 according to Embodiment 1 of the present invention.

In Table 2, k represents a cone coefficient, and A4, A6, A8, A10, A12, A14, A16, A18 and A20 represent aspherical coefficients.

$$y=(x^2/R)/\{1+[1-(k+1)(x^2/R^2)]^{1/2}\}+A4x^4+A6x^6+A8x^8+A10x^{10}+A12x^{12}+A14x^{14}+A16x^{16}+A18x^{18}+A20x^{20} \quad (1)$$

In the above equation (1), x represents a vertical distance between a point on an aspherical curve and the optic axis, and y represents an aspherical depth (a vertical distance between a point on an aspherical surface, having a distance of x from the optic axis, and a surface tangent to a vertex of the aspherical surface on the optic axis).

In the present embodiment, the aspheric surface of each lens surface uses the aspherical surface shown in the above equation (1). However, the present invention is not limited to the aspherical polynomial form shown in the equation (1).

Table 3 and Table 4 show design data of inflection points and stagnation points of respective lenses in the camera optical lens 10 according to Embodiment 1 of the present invention. P1R1 and P1R2 represent the object side surface and the image side surface of the first lens L1, respectively; P2R1 and P2R2 represent the object side surface and the image side surface of the second lens L2, respectively; P3R1 and P3R2 represent the object side surface and the image

TABLE 2

| | Cone coefficient | Aspherical coefficient | | | | |
|---|---|---|---|---|---|---|
| | k | A4 | A6 | A8 | A10 | A12 |
| R1 | 3.2069E−01 | −5.3856E−03 | 7.4526E−03 | −8.3484E−03 | 5.6372E−03 | −2.4131E−03 |
| R2 | −2.1568E+01 | −4.2538E−03 | −3.5198E−03 | 8.0859E−03 | −7.0084E−03 | 3.5737E−03 |
| R3 | 8.2328E+00 | −1.9738E−02 | 5.9977E−03 | −2.8402E−03 | 1.8138E−03 | −7.2997E−04 |
| R4 | 6.4203E+00 | −9.1341E−03 | −5.2361E−03 | 1.5257E−02 | −1.6918E−02 | 1.1409E−02 |
| R5 | −1.5659E+02 | −2.8237E−02 | 1.9952E−02 | −3.3520E−02 | 3.2206E−02 | −2.0078E−02 |
| R6 | −1.6740E+02 | −1.9607E−02 | 1.7857E−02 | −2.5870E−02 | 1.4620E−02 | −3.3163E−03 |
| R7 | 9.5353E+01 | −2.9177E−02 | 4.2237E−02 | −5.4612E−02 | 4.0563E−02 | −1.8277E−02 |
| R8 | −9.5888E+01 | −2.1866E−02 | 1.4285E−02 | −1.6528E−02 | 1.1901E−02 | −5.3120E−03 |
| R9 | −6.5314E+01 | −4.6896E−03 | 7.8986E−03 | −7.8640E−03 | 3.2654E−03 | −6.6213E−04 |
| R10 | −2.5297E+01 | −3.5796E−02 | 2.0540E−02 | −9.1187E−03 | 2.6318E−03 | −5.1711E−04 |
| R11 | −7.1981E+00 | −2.0540E−02 | 1.3647E−02 | −8.7688E−03 | 3.1603E−03 | −7.4231E−04 |
| R12 | −7.8815E+01 | 1.5136E−02 | −7.3802E−03 | 1.0847E−03 | −8.9535E−05 | 1.1983E−06 |
| R13 | 1.7919E+00 | −4.6579E−02 | 1.1205E−02 | −1.8160E−03 | 2.1977E−04 | −1.8017E−05 |
| R14 | −2.1033E+01 | −1.7226E−02 | 2.0790E−03 | −6.0206E−05 | −2.4332E−05 | 3.8778E−06 |

| | Cone coefficient | Aspherical coefficient | | | |
|---|---|---|---|---|---|
| | k | A14 | A16 | A18 | A20 |
| R1 | 3.2069E−01 | 6.4930E−04 | −1.0636E−04 | 9.6314E−06 | −3.7050E−07 |
| R2 | −2.1568E+01 | −1.1284E−03 | 2.1529E−04 | −2.2657E−05 | 1.0060E−06 |
| R3 | 8.2328E+00 | 1.4653E−04 | −9.5976E−06 | −7.9718E−07 | 9.4906E−08 |
| R4 | 6.4203E+00 | −4.8325E−03 | 1.2426E−03 | −1.7637E−04 | 1.0539E−05 |
| R5 | −1.5659E+02 | 8.0033E−03 | −1.9585E−03 | 2.6868E−04 | −1.5859E−05 |
| R6 | −1.6740E+02 | −2.1737E−04 | 2.7482E−04 | −5.2995E−05 | 3.4336E−06 |
| R7 | 9.5353E+01 | 5.1512E−03 | −8.9371E−04 | 8.7948E−05 | −3.7804E−06 |
| R8 | −9.5888E+01 | 1.4800E−03 | −2.5062E−04 | 2.3464E−05 | −9.1902E−07 |
| R9 | −6.5314E+01 | 1.8237E−05 | 1.8143E−05 | −3.2561E−06 | 1.7851E−07 |
| R10 | −2.5297E+01 | 6.8105E−05 | −5.7568E−06 | 2.8064E−07 | −5.8948E−09 |
| R11 | −7.1981E+00 | 1.1178E−04 | −1.0296E−05 | 5.2386E−07 | −1.1152E−08 |
| R12 | −7.8815E+01 | 3.5527E−07 | −7.4016E−09 | −1.4167E−09 | 5.6098E−11 |
| R13 | 1.7919E+00 | 9.5313E−07 | −3.1176E−08 | 5.7509E−10 | −4.5875E−12 |
| R14 | −2.1033E+01 | −2.7379E−07 | 1.0413E−08 | −2.0589E−10 | 1.6563E−12 | side surface of the third lens L3, respectively; P4R1 and P4R2 represent the object side surface and the image side surface of the fourth lens L4, respectively; P5R1 and P5R2 represent the object side surface and the image side surface of the fifth lens L5, respectively, P6R1 and P6R2 represent the object side surface and the image side surface of the sixth lens L6, and P7R1 and P7R2 represent the object side surface and the image side surface of the seventh lens L7, respectively. The data in the column "inflection point position" refers to a vertical distance from an inflection point arranged on each lens surface to the optic axis of the camera optical lens 10. The data in the column "stagnation point position" refers to a vertical distance from a stagnation point arranged on each lens surface to the optic axis of the camera optical lens 10.

TABLE 3

| | Number of inflection points | Inflection point position 1 | Inflection point position 2 |
|---|---|---|---|
| P1R1 | 0 | / | / |
| P1R2 | 1 | 1.935 | / |
| P2R1 | 0 | / | / |
| P2R2 | 0 | / | / |
| P3R1 | 1 | 0.315 | / |
| P3R2 | 2 | 0.555 | 1.765 |
| P4R1 | 2 | 0.565 | 1.665 |
| P4R2 | 1 | 2.075 | / |
| P5R1 | 2 | 0.985 | 2.475 |
| P5R2 | 2 | 0.685 | 2.835 |
| P6R1 | 2 | 1.005 | 2.885 |
| P6R2 | 2 | 1.135 | 3.025 |
| P7R1 | 1 | 2.415 | / |
| P7R2 | 2 | 0.805 | 4.305 |

TABLE 4

| | Number of stagnation points | Stagnation point position 1 | Stagnation point position 2 |
|---|---|---|---|
| P1R1 | 0 | / | / |
| P1R2 | 0 | / | / |
| P2R1 | 0 | / | / |
| P2R2 | 0 | / | / |
| P3R1 | 1 | 0.545 | / |
| P3R2 | 1 | 0.935 | / |
| P4R1 | 2 | 0.965 | 1.935 |
| P4R2 | 0 | / | / |
| P5R1 | 1 | 1.575 | / |
| P5R2 | 1 | 1.555 | / |
| P6R1 | 1 | 1.825 | / |
| P6R2 | 1 | 1.785 | / |
| P7R1 | 1 | 4.075 | / |
| P7R2 | 1 | 1.595 | / |

Figure 2:
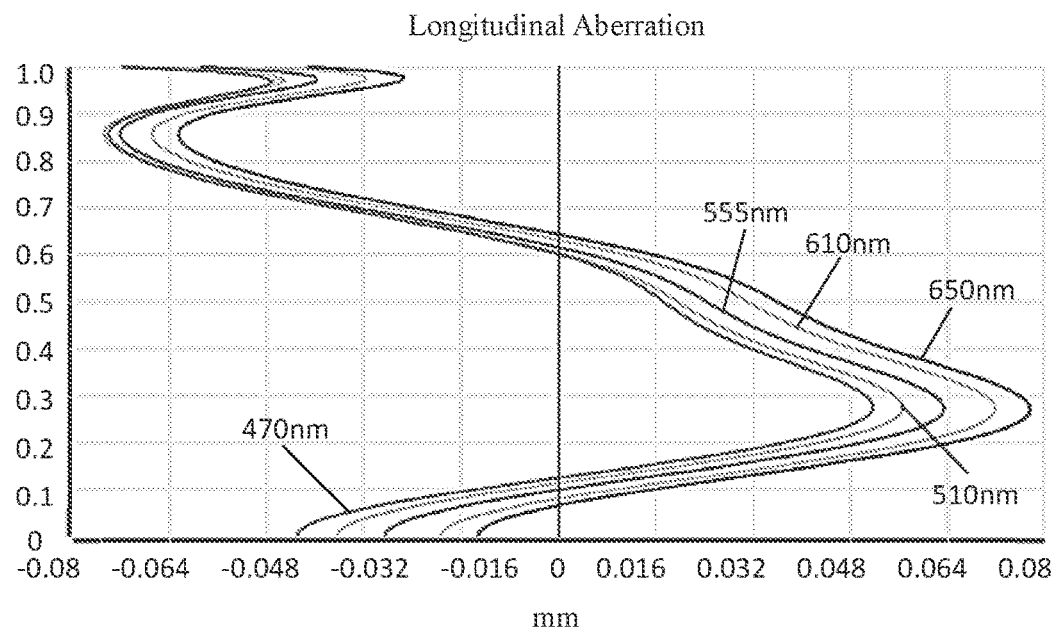
FIG. 2 is a schematic diagram of a longitudinal aberration of the camera optical lens shown in FIG. 1.
Figure 3:
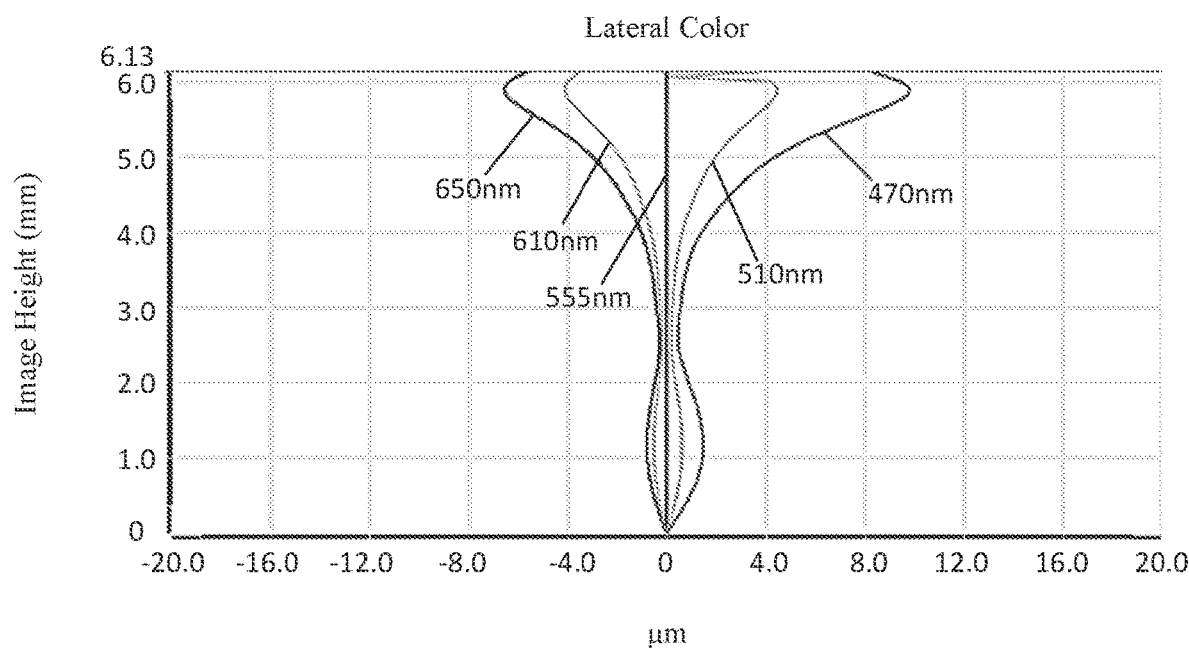
FIG. 3 is a schematic diagram of a lateral color of the camera optical lens shown in FIG. 1.
Figure 4:
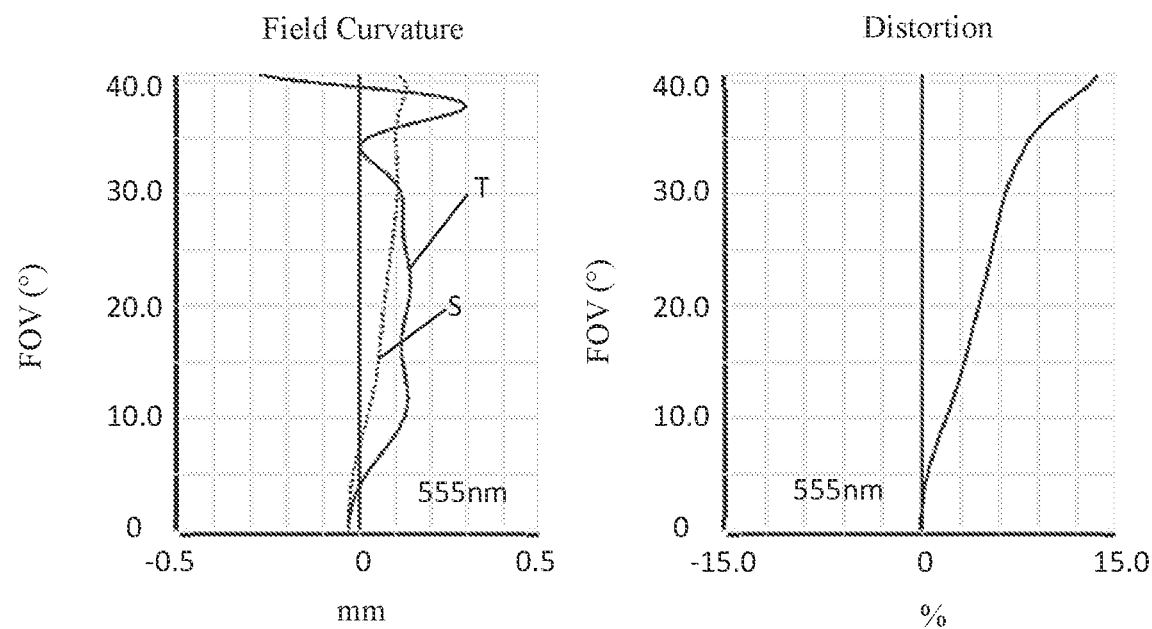
FIG. 4 is a schematic diagram of a field curvature and a distortion of the camera optical lens shown in FIG. 1.
Figure 5:
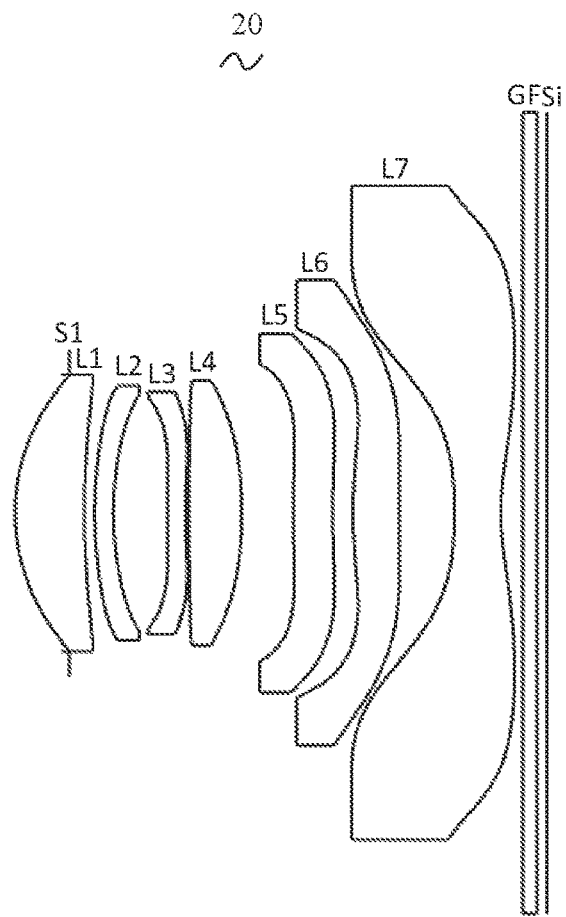
FIG. 5 is a schematic structural diagram of a camera optical lens in accordance with Embodiment 2 of the present invention.

FIG. 2 and FIG. 3 illustrate a longitudinal aberration and a lateral color of light with wavelengths of 650 nm, 610 nm, 555 nm, 510 nm, and 470 nm after passing the camera optical lens 10 according to Embodiment 1. FIG. 4 illustrates a field curvature and a distortion of light with a wavelength of 555 nm after passing the camera optical lens 10 according to Embodiment 1, in which a field curvature S is a field curvature in a sagittal direction and T is a field curvature in a meridian direction.

Table 17 below lists various values and values corresponding to parameters which are specified in the above conditions for each of Embodiments 1, 2, 3, and 4.

As shown in Table 17, Embodiment 1 satisfies the respective conditions.

In this embodiment, the entrance pupil diameter ENPD of the camera optical lens is 4.209 mm. The full field of view image height IH is 6.129 mm. The field of view (FOV) along a diagonal direction is 80.00°. Thus, the camera optical lens 10 satisfies design requirements of ultra-thinness, a large aperture, and a wide angle while having on-axis and off-axis aberrations sufficiently corrected, thereby leading to better optical characteristics.

Embodiment 2

Embodiment 2 is basically the same as Embodiment 1 and involves symbols having the same meanings as Embodiment 1. Only differences from Embodiment 1 will be described in the following.

In this embodiment, the fifth lens L5 has a positive refractive power.

Table 5 and Table 6 show design data of a camera optical lens 20 in Embodiment 2 of the present invention.

TABLE 5

| | R | d | | nd | | vd |
|---|---|---|---|---|---|---|
| S1 | ∞ | d0= | −0.867 | | | |
| R1 | 3.223 | d1= | 1.101 | nd1 | 1.5357 | v1 74.64 |
| R2 | 12.627 | d2= | 0.162 | | | |
| R3 | 7.014 | d3= | 0.300 | nd2 | 1.6700 | v2 19.39 |
| R4 | 5.494 | d4= | 0.853 | | | |
| R5 | 18.849 | d5= | 0.284 | nd3 | 1.6700 | v3 19.39 |
| R6 | 8.663 | d6= | 0.048 | | | |
| R7 | 19.773 | d7= | 0.845 | nd4 | 1.5444 | v4 55.82 |
| R8 | −7.400 | d8= | 0.809 | | | |
| R9 | 19.388 | d9= | 0.625 | nd5 | 1.6400 | v5 23.54 |
| R10 | 19.146 | d10= | 0.321 | | | |
| R11 | 8.276 | d11= | 0.727 | nd6 | 1.5444 | v6 55.82 |
| R12 | 54.622 | d12= | 0.880 | | | |
| R13 | −8.55 | d13= | 0.734 | nd7 | 1.5444 | v7 55.82 |
| R14 | 4.093 | d14= | 0.349 | | | |
| R15 | ∞ | d15= | 0.210 | ndg | 1.5168 | vg 64.17 |
| R16 | ∞ | d16= | 0.161 | | | |

Table 6 shows aspherical surface data of respective lenses in the camera optical lens 20 according to Embodiment 2 of the present invention.

TABLE 6

| | Cone coefficient | Aspherical coefficient | | | | |
|---|---|---|---|---|---|---|
| | k | A4 | A6 | A8 | A10 | A12 |
| R1 | 3.4130E−01 | −1.4291E−03 | −3.5011E−04 | 9.2096E−05 | −4.7313E−05 | 5.0159E−06 |
| R2 | −1.4182E+01 | −4.6115E−03 | 2.1564E−03 | −6.0744E−04 | 1.0182E−04 | −4.0139E−06 |
| R3 | 8.8577E+00 | −1.1844E−02 | 4.1861E−03 | −1.5571E−03 | 9.1151E−04 | −5.2813E−04 |
| R4 | 5.9087E+00 | −8.0343E−03 | 2.0290E−03 | −2.3256E−05 | −4.3353E−04 | 3.0933E−04 |
| R5 | −2.0000E+02 | −2.7181E−02 | 5.5424E−03 | −1.0634E−02 | 9.2379E−03 | −5.4450E−03 |
| R6 | −1.4860E+02 | −1.1830E−02 | −1.4889E−04 | −8.1569E−03 | 7.1279E−03 | −3.2541E−03 |
| R7 | 7.3818E+01 | −2.0255E−02 | 2.2004E−02 | −2.3319E−02 | 1.5874E−02 | −6.7138E−03 |

TABLE 6-continued

| | | | | | |
|---|---|---|---|---|---|
| R8 | −4.3987E+01 | −2.3749E−02 | 1.5886E−03 | 3.0727E−03 | −2.9567E−03 | 1.5748E−03 |
| R9 | −8.5566E+01 | −3.2628E−03 | −5.3101E−03 | 6.7635E−04 | 3.6361E−04 | −2.1343E−04 |
| R10 | 5.8277E+00 | 2.8003E−03 | −8.1346E−03 | 1.4653E−03 | 2.3406E−04 | −1.8488E−04 |
| R11 | −2.0332E+00 | −3.5426E−03 | −4.2355E−03 | 1.6042E−04 | 1.9571E−04 | −4.0228E−05 |
| R12 | 7.2671E+01 | −5.1370E−03 | −4.2869E−04 | −7.3107E−04 | 2.9888E−04 | −4.9782E−05 |
| R13 | 1.7900E+00 | −4.0009E−02 | 8.8532E−03 | −1.6320E−03 | 2.4175E−04 | −2.3144E−05 |
| R14 | −1.1774E+01 | −1.6752E−02 | 3.2861E−03 | −4.3245E−04 | 3.9314E−05 | −2.5018E−06 |

| | Cone coefficient | Aspherical coefficient | | | |
|---|---|---|---|---|---|
| | k | A14 | A16 | A18 | A20 |
| R1 | 3.4130E−01 | 1.7299E−06 | −8.3867E−07 | 1.2765E−07 | −7.8141E−09 |
| R2 | −1.4182E+01 | −3.5223E−06 | 9.1473E−07 | −9.1461E−08 | 2.7365E−09 |
| R3 | 8.8577E+00 | 2.0623E−04 | −4.8863E−05 | 6.3902E−06 | −3.5332E−07 |
| R4 | 5.9087E+00 | −1.3626E−04 | 3.7735E−05 | −6.0703E−06 | 4.3027E−07 |
| R5 | −2.0000E+02 | 2.1507E−03 | −5.3332E−04 | 7.4960E−05 | −4.5324E−06 |
| R6 | −1.4860E+02 | 9.4181E−04 | −1.7551E−04 | 1.9706E−05 | −1.0151E−06 |
| R7 | 7.3818E+01 | 1.7868E−03 | −2.9377E−04 | 2.7385E−05 | −1.1094E−06 |
| R8 | −4.3987E+01 | −5.1270E−04 | 9.9336E−05 | −1.0603E−05 | 4.8417E−07 |
| R9 | −8.5566E+01 | 4.5665E−05 | −4.1917E−06 | 3.2308E−08 | 1.2240E−08 |
| R10 | 5.8277E+00 | 4.3861E−05 | −5.4155E−06 | 3.4696E−07 | −9.0494E−09 |
| R11 | −2.0332E+00 | 9.7959E−07 | 5.5921E−07 | −7.0779E−08 | 2.6883E−09 |
| R12 | 7.2671E+01 | 4.3964E−06 | −2.1260E−06 | 5.2073E−09 | −4.8656E−11 |
| R13 | 1.7900E+00 | 1.3665E−06 | −4.8483E−08 | 9.5299E−10 | −8.0041E−12 |
| R14 | −1.1774E+01 | 1.0880E−07 | −3.0858E−09 | 5.1364E−11 | −3.7758E−13 |

Table 7 and Table 8 show design data of inflection points and stagnation points of respective lenses in the camera optical lens 20 according to Embodiment 2 of the present invention.

TABLE 7

| | Number of inflection points | Inflection point position 1 | Inflection point position 2 | Inflection point position 3 |
|---|---|---|---|---|
| P1R1 | 1 | 2.205 | / | / |
| P1R2 | 1 | 1.805 | / | / |
| P2R1 | 0 | / | / | / |
| P2R2 | 0 | / | / | / |
| P3R1 | 1 | 0.395 | / | / |
| P3R2 | 2 | 0.575 | 1.875 | / |
| P4R1 | 2 | 0.785 | 1.245 | / |
| P4R2 | 0 | / | / | / |
| P5R1 | 1 | 0.675 | / | / |
| P5R2 | 2 | 0.795 | 2.845 | / |
| P6R1 | 1 | 0.935 | / | / |
| P6R2 | 3 | 0.525 | 3.315 | 3.515 |
| P7R1 | 1 | 2.445 | / | / |
| P7R2 | 2 | 0.975 | 4.915 | / |

TABLE 8

| | Number of stagnation points | Stagnation point position 1 |
|---|---|---|
| P1R1 | 0 | / |
| P1R2 | 0 | / |
| P2R1 | 0 | / |
| P2R2 | 0 | / |
| P3R1 | 1 | 0.675 |
| P3R2 | 1 | 0.985 |
| P4R1 | 0 | / |
| P4R2 | 0 | / |
| P5R1 | 1 | 1.065 |
| P5R2 | 1 | 1.225 |
| P6R1 | 1 | 1.495 |
| P6R2 | 1 | 0.865 |
| P7R1 | 1 | 4.195 |
| P7R2 | 1 | 2.585 |

Figure 6:
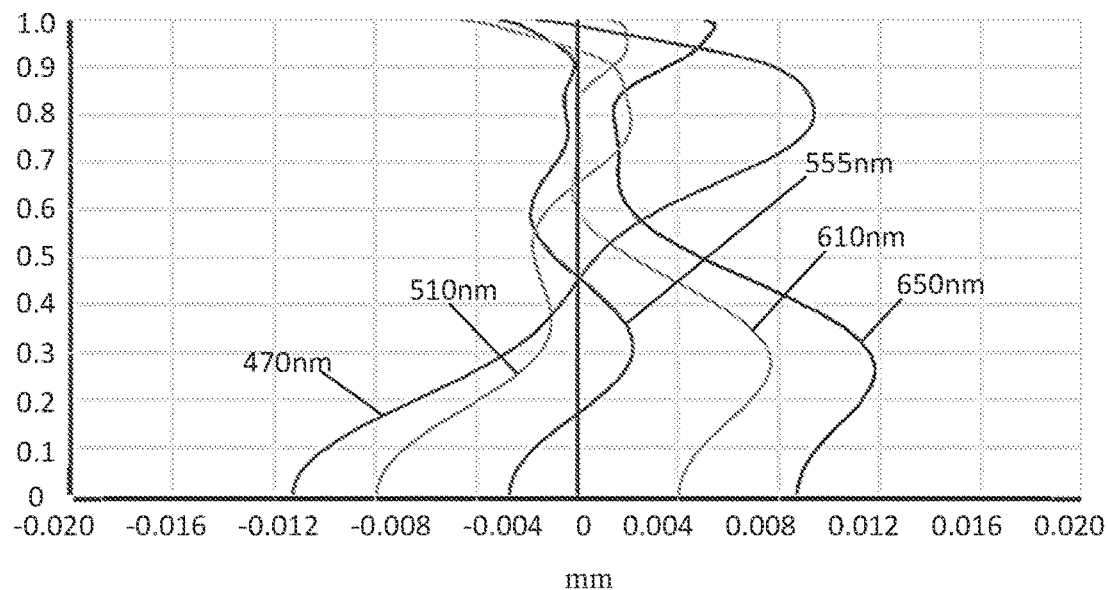
FIG. 6 is a schematic diagram of a longitudinal aberration of the camera optical lens shown in FIG. 5.
Figure 7:
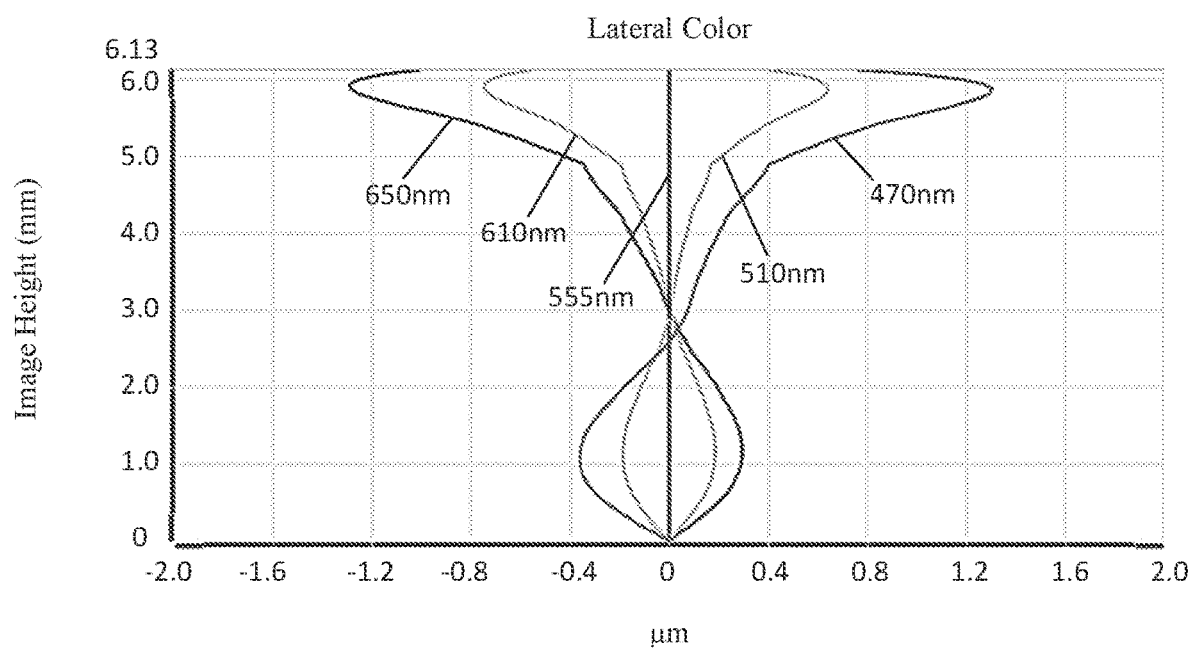
FIG. 7 is a schematic diagram of a lateral color of the camera optical lens shown in FIG. 5.
Figure 8:
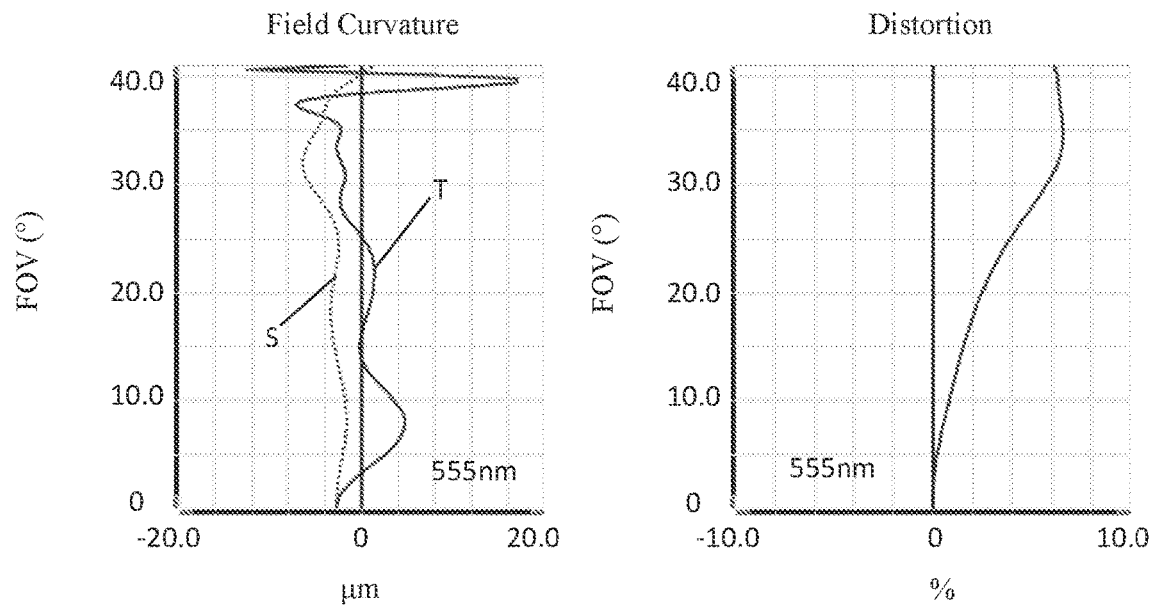
FIG. 8 is a schematic diagram of a field curvature and a distortion of the camera optical lens shown in FIG. 5.
Figure 9:
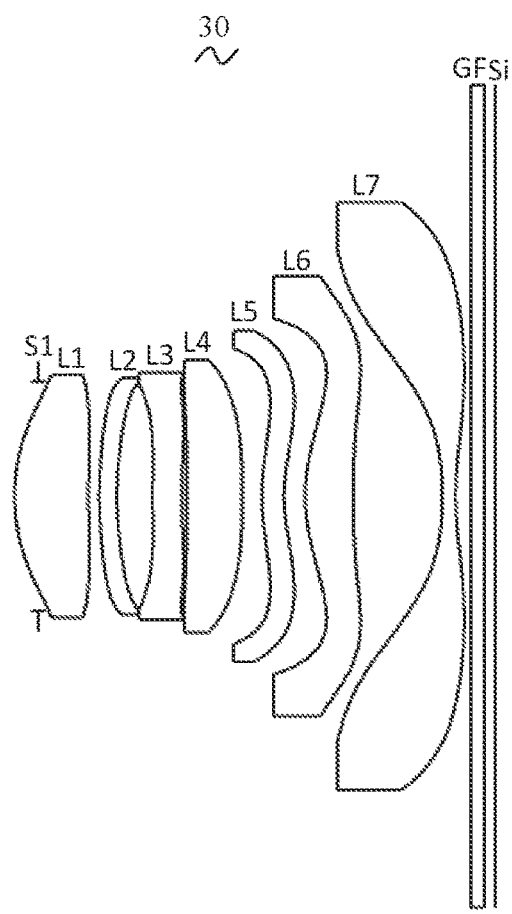
FIG. 9 is a schematic structural diagram of a camera optical lens in accordance with Embodiment 3 of the present invention.

FIG. 6 and FIG. 7 illustrate a longitudinal aberration and a lateral color of light with wavelengths of 650 nm, 610 nm, 555 nm, 510 nm, and 470 nm after passing the camera optical lens 20 according to Embodiment 2. FIG. 8 illustrates a field curvature and a distortion of light with a wavelength of 555 nm after passing the camera optical lens 20 according to Embodiment 2.

As shown in Table 17, Embodiment 2 satisfies the respective conditions.

In this embodiment, the entrance pupil diameter ENPD of the camera optical lens is 4.484 mm. The full field of view image height IH is 6.129 mm. The field of view (FOV) along a diagonal direction is 80.00°. Thus, the camera optical lens 20 satisfies design requirements of ultra-thinness, a large aperture, and a wide angle while having on-axis and off-axis aberrations sufficiently corrected, thereby leading to better optical characteristics.

Embodiment 3

Embodiment 3 is basically the same as Embodiment 1 and involves symbols having the same meanings as Embodiment 1. Only differences from Embodiment 1 will be described in the following.

Table 9 and Table 10 show design data of a camera optical lens 30 in Embodiment 3 of the present invention.

TABLE 9

| | R | d | | nd | | vd | |
|---|---|---|---|---|---|---|---|
| S1 | ∞ | d0= | −0.415 | | | | |
| R1 | 3.419 | d1= | 1.300 | nd1 | 1.4959 | v1 | 81.65 |
| R2 | 28.786 | d2= | 0.190 | | | | |
| R3 | 7.902 | d3= | 0.309 | nd2 | 1.6700 | v2 | 19.39 |
| R4 | 6.545 | d4= | 0.622 | | | | |
| R5 | 34.379 | d5= | 0.516 | nd3 | 1.6700 | v3 | 19.39 |
| R6 | 13.135 | d6= | 0.084 | | | | |
| R7 | 975.601 | d7= | 0.979 | nd4 | 1.5444 | v4 | 55.82 |
| R8 | −20.490 | d8= | 0.339 | | | | |
| R9 | 3.583 | d9= | 0.389 | nd5 | 1.6400 | v5 | 23.54 |
| R10 | 2.803 | d10= | 0.369 | | | | |
| R11 | 2.996 | d11= | 0.849 | nd6 | 1.5444 | v6 | 55.82 |

TABLE 9-continued

| | R | d | nd | | vd | |
|---|---|---|---|---|---|---|
| R12 | 29.950 | d12= | 1.563 | | | |
| R13 | −6.441 | d13= | 0.229 | nd7 | 1.5444 | v7 55.82 |
| R14 | 5.477 | d14= | 0.268 | | | |
| R15 | ∞ | d15= | 0.240 | ndg | 1.5168 | vg 64.17 |
| R16 | ∞ | d16= | 0.186 | | | |

Table 10 shows aspheric surface data of respective lenses in the camera optical lens 30 according to Embodiment 3 of the present invention.

TABLE 10

| | Cone coefficient | Aspherical coefficient | | | | |
|---|---|---|---|---|---|---|
| | k | A4 | A6 | A8 | A10 | A12 |
| R1 | 1.7170E−01 | −3.4998E−03 | −9.7647E−06 | −1.2532E−03 | 8.0922E−04 | −4.2262E−04 |
| R2 | −1.9900E+02 | −1.0603E−02 | 5.9343E−04 | 1.3623E−04 | −4.0791E−04 | 1.7411E−04 |
| R3 | 8.0628E+00 | −1.9833E−02 | 3.9875E−03 | 8.1297E−04 | −2.5566E−04 | −9.5724E−05 |
| R4 | 6.1480E+00 | −1.6519E−02 | 1.1267E−03 | 8.5853E−04 | 5.9254E−04 | −1.0783E−03 |
| R5 | −2.7574E+00 | −2.7244E−02 | −7.0917E−04 | −3.8792E−03 | 4.4323E−03 | −3.2290E−03 |
| R6 | −1.4540E+02 | −1.9105E−02 | 2.4142E−02 | −3.5862E−02 | 2.4951E−02 | −9.7034E−03 |
| R7 | −1.9881E+02 | −2.5194E−02 | 4.8272E−02 | −6.0041E−02 | 4.2032E−02 | −1.7656E−02 |
| R8 | 1.3643E+01 | −3.2325E−02 | 1.2240E−02 | −8.4420E−03 | 4.6005E−03 | −1.6089E−03 |
| R9 | −2.9392E+01 | −8.3454E−03 | −6.0874E−03 | 7.0818E−03 | −5.8065E−03 | 2.6274E−03 |
| R10 | −1.4811E+01 | −4.4555E−02 | 2.1865E−02 | −9.3127E−03 | 2.3075E−03 | −3.5261E−04 |
| R11 | −6.0447E+00 | −1.7756E−02 | 7.1342E−03 | −3.3913E−03 | 1.0004E−03 | −2.4198E−04 |
| R12 | 4.9546E+01 | 2.2992E−02 | −1.2125E−02 | 3.9643E−03 | −1.0813E−03 | 2.0161E−04 |
| R13 | 5.2810E−01 | −4.8440E−02 | 1.3210E−02 | −2.2644E−03 | 2.8687E−04 | −2.4539E−05 |
| R14 | −1.7355E+01 | −1.9553E−02 | 3.2462E−03 | −3.0501E−04 | 1.1490E−05 | 5.1770E−07 |

| | Cone coefficient | Aspherical coefficient | | | |
|---|---|---|---|---|---|
| | k | A14 | A16 | A18 | A20 |
| R1 | 1.7170E−01 | 1.2605E−04 | −2.3604E−05 | 2.3920E−06 | −8.5755E−08 |
| R2 | −1.9900E+02 | −4.9909E−05 | 9.9943E−06 | −1.0188E−06 | 1.8588E−08 |
| R3 | 8.0628E+00 | 1.1507E−04 | −3.6635E−05 | 5.7816E−06 | −3.2163E−07 |
| R4 | 6.1480E+00 | 6.8591E−04 | −2.2410E−04 | 3.7570E−05 | −2.2372E−06 |
| R5 | −2.7574E+00 | 1.5876E−03 | −4.7002E−04 | 7.8654E−05 | −5.8888E−06 |
| R6 | −1.4540E+02 | 2.2471E−03 | −3.0396E−04 | 2.3630E−05 | −9.7673E−07 |
| R7 | −1.9881E+02 | 4.5943E−03 | −7.3358E−04 | 6.6638E−05 | −2.6076E−06 |
| R8 | 1.3643E+01 | 3.4668E−04 | −4.4090E−05 | 2.6678E−06 | −2.8744E−08 |
| R9 | −2.9392E+01 | −7.1250E−04 | 1.1564E−04 | −1.0427E−05 | 3.9629E−07 |
| R10 | −1.4811E+01 | 3.2628E−05 | −1.6482E−06 | 1.5615E−08 | 1.8639E−09 |
| R11 | −6.0447E+00 | 4.1969E−05 | −4.5754E−06 | 2.7209E−07 | −6.8222E−09 |
| R12 | 4.9546E+01 | −2.4069E−05 | 1.7531E−06 | −7.0466E−08 | 1.1914E−09 |
| R13 | 5.2810E−01 | 1.3502E−06 | −4.5799E−08 | 8.7457E−10 | −7.2370E−12 |
| R14 | −1.7355E+01 | −7.8837E−08 | 3.5999E−09 | −7.3998E−11 | 5.5782E−13 |

Table 11 and Table 12 show design data of inflection points and stagnation points of respective lenses in the camera optical lens 30 according to Embodiment 3 of the present invention.

TABLE 11

| | Number of inflection points | Inflection point position 1 | Inflection point position 2 | Inflection point position 3 |
|---|---|---|---|---|
| P1R1 | 1 | 1.825 | / | / |
| P1R2 | 1 | 0.655 | / | / |
| P2R1 | 0 | / | / | / |
| P2R2 | 0 | / | / | / |
| P3R1 | 1 | 0.395 | / | / |
| P3R2 | 2 | 0.725 | 1.745 | / |
| P4R1 | 2 | 0.085 | 1.875 | / |
| P4R2 | 0 | / | / | / |
| P5R1 | 1 | 0.875 | / | / |
| P5R2 | 1 | 0.795 | / | / |
| P6R1 | 1 | 1.295 | / | / |
| P6R2 | 3 | 1.595 | 3.585 | 3.825 |
| P7R1 | 2 | 2.635 | 4.265 | / |
| P7R2 | 1 | 0.985 | / | / |

TABLE 12

| | Number of stagnation points | Stagnation point position 1 | Stagnation point position 2 |
|---|---|---|---|
| P1R1 | 0 | / | / |
| P1R2 | 1 | 1.135 | / |
| P2R1 | 0 | / | / |
| P2R2 | 0 | / | / |
| P3R1 | 1 | 0.665 | / |
| P3R2 | 2 | 1.205 | 1.985 |
| P4R1 | 2 | 0.135 | 2.105 |
| P4R2 | 0 | / | / |
| P5R1 | 1 | 1.665 | / |
| P5R2 | 1 | 1.715 | / |
| P6R1 | 1 | 2.205 | / |
| P6R2 | 1 | 2.265 | / |
| P7R1 | 0 | / | / |
| P7R2 | 1 | 2.225 | / |

Figure 10:
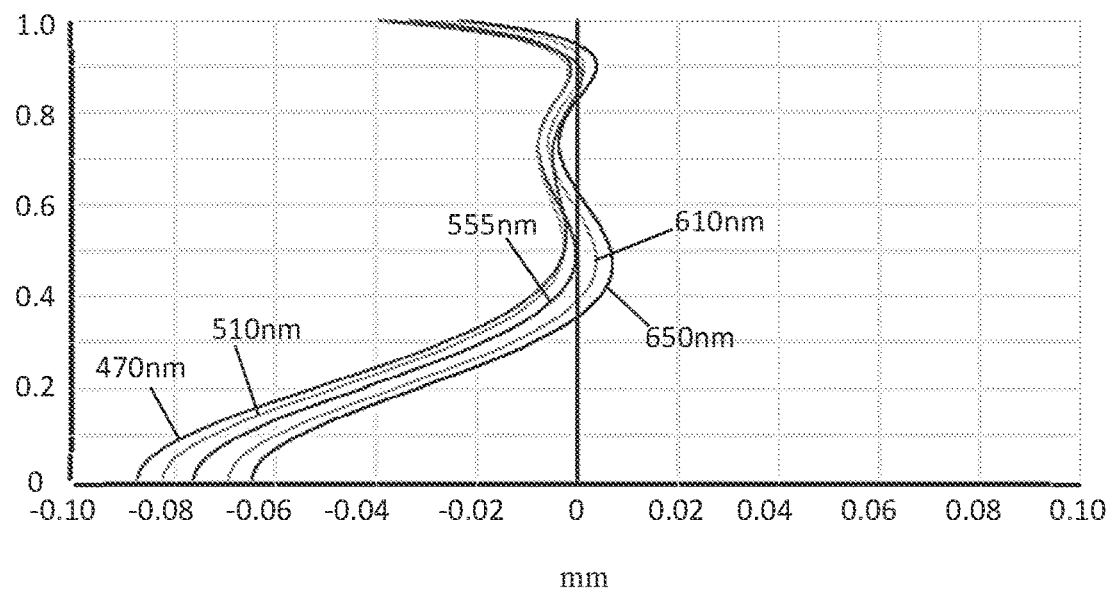
FIG. 10 is a schematic diagram of a longitudinal aberration of the camera optical lens shown in FIG. 9.
Figure 11:
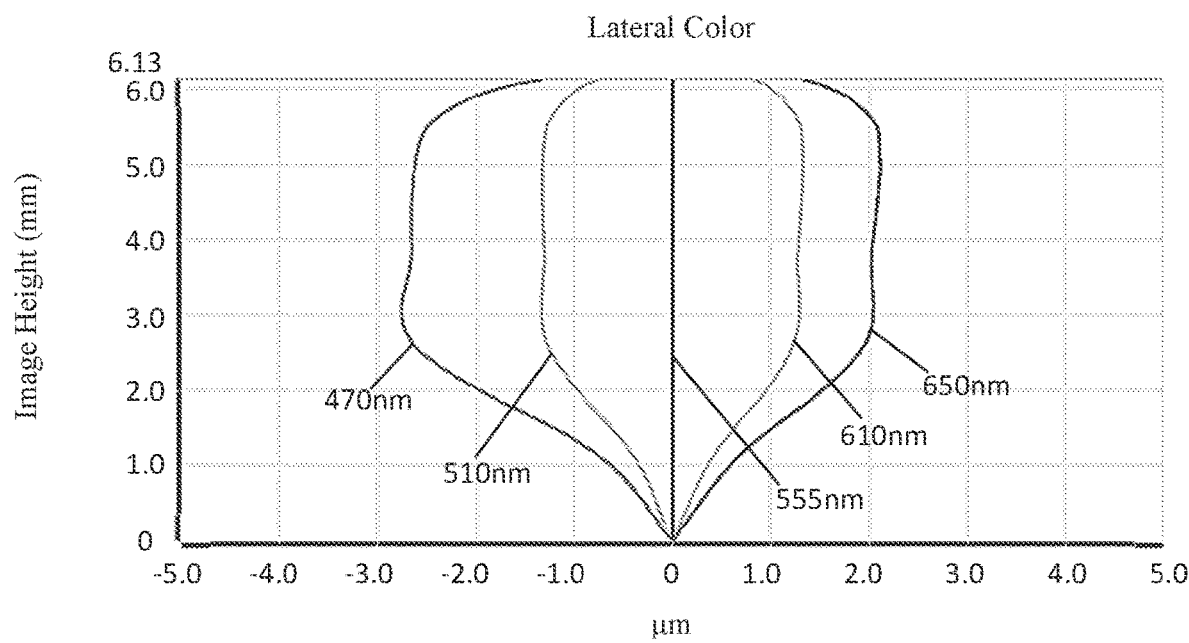
FIG. 11 is a schematic diagram of a lateral color of the camera optical lens shown in FIG. 9.
Figure 12:
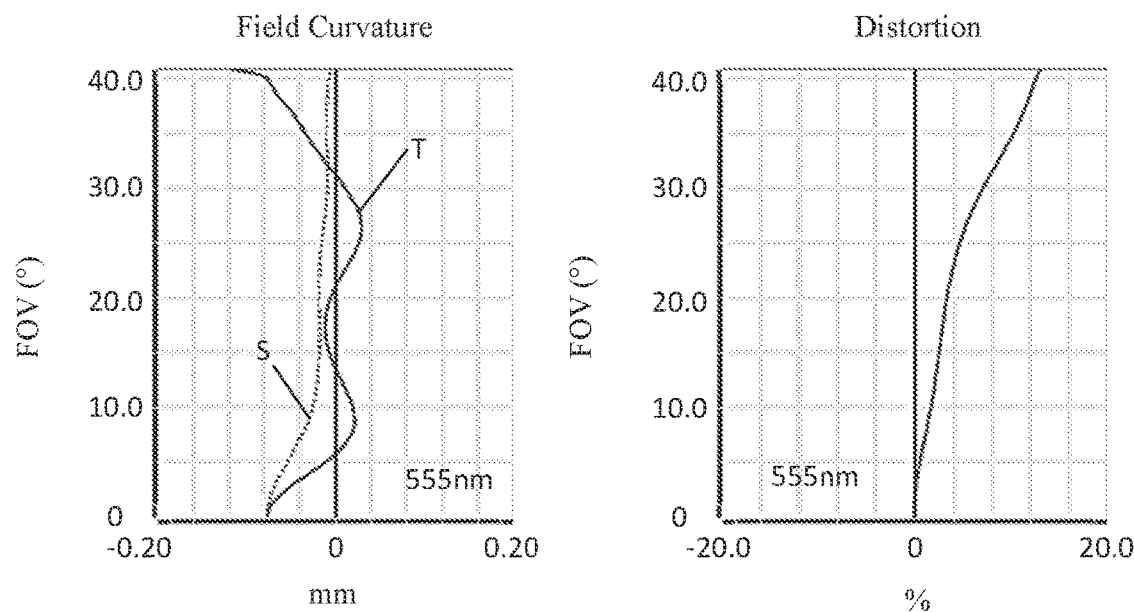
FIG. 12 is a schematic diagram of a field curvature and a distortion of the camera optical lens shown in FIG. 9.
Figure 13:
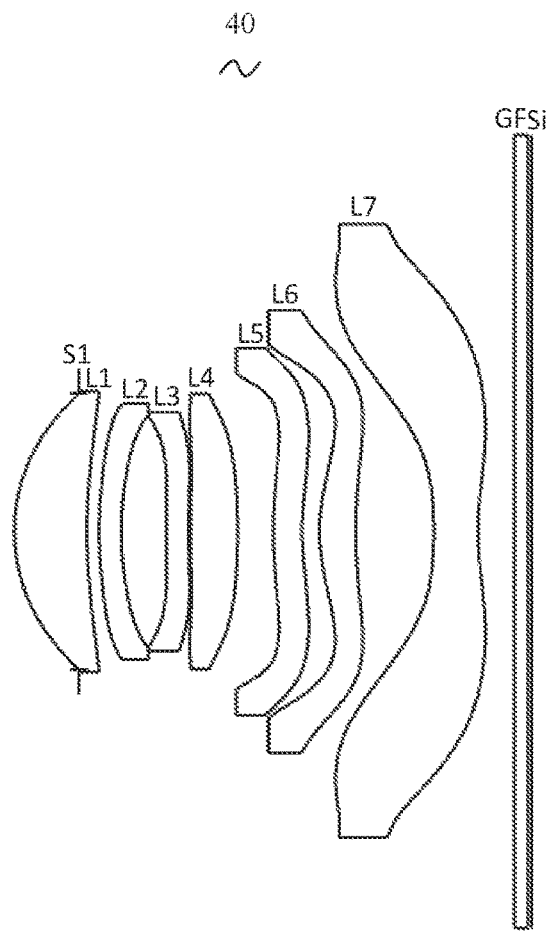
FIG. 13 is a schematic structural diagram of a camera optical lens in accordance with Embodiment 4 of the present invention.

FIG. 10 and FIG. 11 illustrate a longitudinal aberration and a lateral color of light with wavelengths of 650 nm, 610 nm, 555 nm, 510 nm, and 470 nm after passing the camera optical lens 30 according to Embodiment 3. FIG. 12 illustrates field curvature and distortion of light with a wavelength of 555 nm after passing the camera optical lens 30 according to Embodiment 3.

Table 17 below lists various values and values corresponding to parameters which are specified in the above conditions in the present embodiment. It can be seen that the camera optical lens according to this embodiment satisfies the above conditions.

In this embodiment, the entrance pupil diameter ENPD of the camera optical lens is 4.148 mm. The full field of view image height IH is 6.129 mm. The field of view (FOV) along a diagonal direction is 80.00°. Thus, the camera optical lens 30 satisfies design requirements of ultra-thinness, a large aperture, a wide angle while having on-axis and off-axis aberrations sufficiently corrected, thereby leading to better optical characteristics.

Embodiment 4

Embodiment 4 is basically the same as Embodiment 1 and involves symbols having the same meanings as Embodiment 1. Only differences from Embodiment 1 will be described in the following.

Table 13 and Table 14 show design data of a camera optical lens 40 in Embodiment 4 of the present invention.

TABLE 13

| | R | d | | nd | | vd |
|---|---|---|---|---|---|---|
| S1 | ∞ | d0= | −1.025 | | | |
| R1 | 2.941 | d1= | 1.148 | nd1 | 1.5357 | v1 | 74.64 |
| R2 | 8.391 | d2= | 0.194 | | | |
| R3 | 6.624 | d3= | 0.351 | nd2 | 1.6700 | v2 | 19.39 |
| R4 | 5.456 | d4= | 0.714 | | | |
| R5 | 32.387 | d5= | 0.350 | nd3 | 1.6700 | v3 | 19.39 |
| R6 | 11.183 | d6= | 0.034 | | | |
| R7 | 21.602 | d7= | 0.741 | nd4 | 1.5444 | v4 | 55.82 |
| R8 | −15.831 | d8= | 0.554 | | | |
| R9 | 5.857 | d9= | 0.461 | nd5 | 1.6400 | v5 | 23.54 |
| R10 | 4.060 | d10= | 0.273 | | | |
| R11 | 2.886 | d11= | 0.574 | nd6 | 1.5444 | v6 | 55.82 |
| R12 | 9.668 | d12= | 1.235 | | | |
| R13 | −8.837 | d13= | 0.695 | nd7 | 1.5444 | v7 | 55.82 |
| R14 | 4.023 | d14= | 0.585 | | | |
| R15 | ∞ | d15= | 0.210 | ndg | 1.5168 | vg | 64.17 |
| R16 | ∞ | d16= | 0.062 | | | |

Table 14 shows aspheric surface data of respective lenses in the camera optical lens 40 according to Embodiment 4 of the present invention.

TABLE 14

| | Cone coefficient | Aspherical coefficient | | | | |
|---|---|---|---|---|---|---|
| | k | A4 | A6 | A8 | A10 | A12 |
| R1 | 3.0908E−01 | −1.9885E−03 | 4.6077E−04 | −9.4815E−04 | 7.3805E−04 | −3.6634E−04 |
| R2 | −2.1759E+01 | −4.7544E−03 | 1.0962E−03 | 2.8535E−04 | −3.2604E−04 | 1.5194E−04 |
| R3 | 8.2123E+00 | −1.8258E−02 | 3.0331E−03 | 6.1176E−04 | −2.8613E−04 | −9.7112E−05 |
| R4 | 6.3313E+00 | −1.1287E−02 | 1.8045E−03 | 4.9120E−04 | 4.4940E−04 | −9.5368E−04 |
| R5 | −9.9589E+01 | −2.1515E−02 | 1.7095E−04 | −3.3780E−03 | 3.7976E−03 | −2.8618E−03 |
| R6 | −1.5914E+02 | −2.0440E−02 | 2.0375E−02 | −3.1460E−02 | 2.1843E−02 | −8.5027E−03 |
| R7 | 9.6336E+01 | −2.8285E−02 | 4.2069E−02 | −5.2530E−02 | 3.6828E−02 | −1.5455E−02 |
| R8 | −9.4348E+01 | −2.2275E−02 | 9.6162E−03 | −7.4455E−03 | 4.0398E−03 | −1.4060E−03 |
| R9 | −6.7813E+01 | −1.2690E−03 | −4.3166E−03 | 6.1021E−03 | −5.0922E−03 | 2.3016E−03 |
| R10 | −2.6070E+01 | −3.5781E−02 | 2.0202E−02 | −8.1474E−03 | 1.9995E−03 | −3.0973E−04 |
| R11 | −7.1794E+00 | −1.7735E−02 | 5.9425E−03 | −2.9992E−03 | 8.8754E−04 | −2.1151E−04 |
| R12 | −8.1174E+01 | 1.6805E−02 | −1.0638E−02 | 3.4717E−03 | −9.4574E−04 | 1.7657E−04 |
| R13 | 1.7973E+00 | −4.6922E−02 | 1.1625E−02 | −1.9791E−03 | 2.5126E−04 | −2.1491E−05 |
| R14 | −2.2226E+01 | −1.8006E−02 | 2.6782E−03 | −2.5955E−04 | 1.0137E−05 | 4.4993E−07 |

| | Cone coefficient | Aspherical coefficient | | | |
|---|---|---|---|---|---|
| | k | A14 | A16 | A18 | A20 |
| R1 | 3.0908E−01 | 1.1105E−04 | −2.0494E−05 | 2.1069E−06 | −9.5100E−08 |
| R2 | −2.1759E+01 | −4.5596E−05 | 8.4249E−06 | −8.6025E−07 | 3.6281E−08 |
| R3 | 8.2123E+00 | 9.9371E−05 | −3.2149E−05 | 5.0235E−06 | −3.1770E−07 |
| R4 | 6.3313E+00 | 6.0136E−04 | −1.9534E−04 | 3.2851E−05 | −2.2704E−06 |
| R5 | −9.9589E+01 | 1.3829E−03 | −4.1181E−04 | 6.9337E−05 | −5.0046E−06 |
| R6 | −1.5914E+02 | 1.9652E−03 | −2.6678E−04 | 2.0652E−05 | −7.9631E−07 |
| R7 | 9.6336E+01 | 4.0235E−03 | −6.4239E−04 | 5.8274E−05 | −2.3281E−06 |
| R8 | −9.4348E+01 | 3.0397E−04 | −3.8583E−05 | 2.3417E−06 | −2.2450E−08 |
| R9 | −6.7813E+01 | −6.2381E−04 | 1.0126E−04 | −9.1255E−06 | 3.5080E−07 |
| R10 | −2.6070E+01 | 2.8850E−05 | −1.3946E−06 | 1.5929E−08 | 8.6528E−10 |
| R11 | −7.1794E+00 | 3.6617E−05 | −4.0059E−06 | 2.4078E−07 | −5.9534E−09 |
| R12 | −8.1174E+01 | −2.1077E−05 | 1.5350E−06 | −6.1704E−08 | 1.0435E−09 |
| R13 | 1.7973E+00 | 1.1821E−06 | −4.0108E−08 | 7.6596E−10 | −6.3135E−12 |
| R14 | −2.2226E+01 | −6.9147E−08 | 3.1531E−09 | −6.4698E−11 | 4.9634E−13 |

Table 15 and Table 16 show design data of inflection points and stagnation points of respective lenses in the camera optical lens 40 according to Embodiment 4 of the present invention.

TABLE 15

|  | Number of inflection points | Inflection point position 1 | Inflection point position 2 | Inflection point position 3 |
| --- | --- | --- | --- | --- |
| P1R1 | 1 | 2.195 | / | / |
| P1R2 | 1 | 1.805 | / | / |
| P2R1 | 0 | / | / | / |
| P2R2 | 0 | / | / | / |
| P3R1 | 1 | 0.345 | / | / |
| P3R2 | 2 | 0.565 | 1.755 | / |
| P4R1 | 2 | 0.615 | 1.635 | / |
| P4R2 | 1 | 2.085 | / | / |
| P5R1 | 2 | 0.935 | 2.495 | / |
| P5R2 | 2 | 0.695 | 2.855 | / |
| P6R1 | 2 | 1.015 | 2.875 | / |
| P6R2 | 2 | 1.175 | 3.055 | / |
| P7R1 | 2 | 2.415 | 4.595 | / |
| P7R2 | 3 | 0.785 | 4.305 | 4.955 |

TABLE 16

|  | Number of stagnation points | Stagnation point position 1 | Stagnation point position 2 |
| --- | --- | --- | --- |
| P1R1 | 0 | / | / |
| P1R2 | 0 | / | / |
| P2R1 | 0 | / | / |
| P2R2 | 0 | / | / |
| P3R1 | 1 | 0.585 | / |
| P3R2 | 1 | 0.945 | / |
| P4R1 | 2 | 1.015 | 1.895 |
| P4R2 | 0 | / | / |
| P5R1 | 1 | 1.575 | / |
| P5R2 | 1 | 1.565 | / |
| P6R1 | 1 | 1.775 | / |
| P6R2 | 1 | 1.795 | / |
| P7R1 | 1 | 4.085 | / |
| P7R2 | 1 | 1.675 | / |

Figure 14:
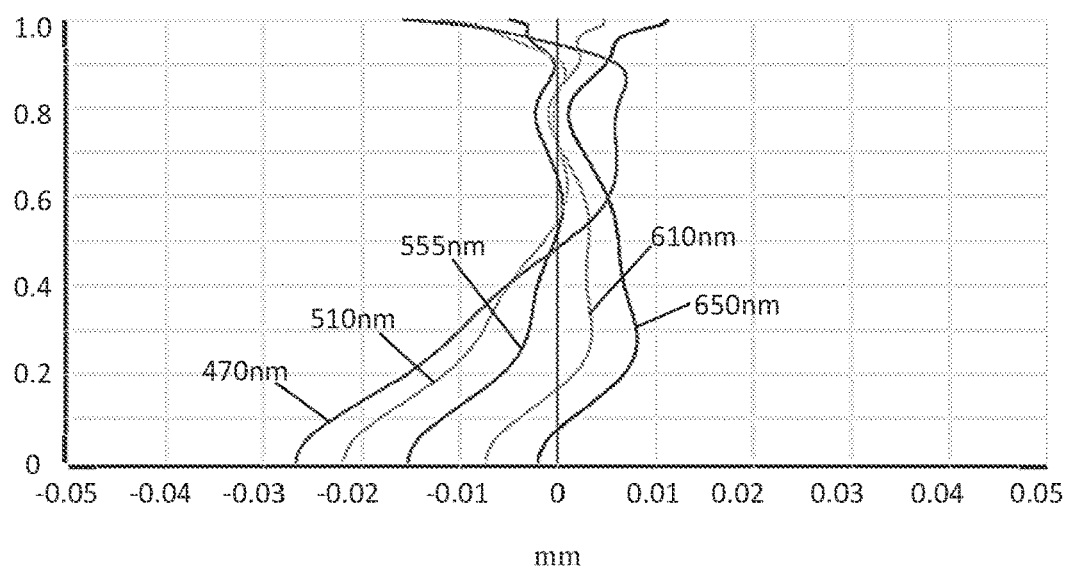
FIG. 14 is a schematic diagram of a longitudinal aberration of the camera optical lens shown in FIG. 13.
Figure 15:
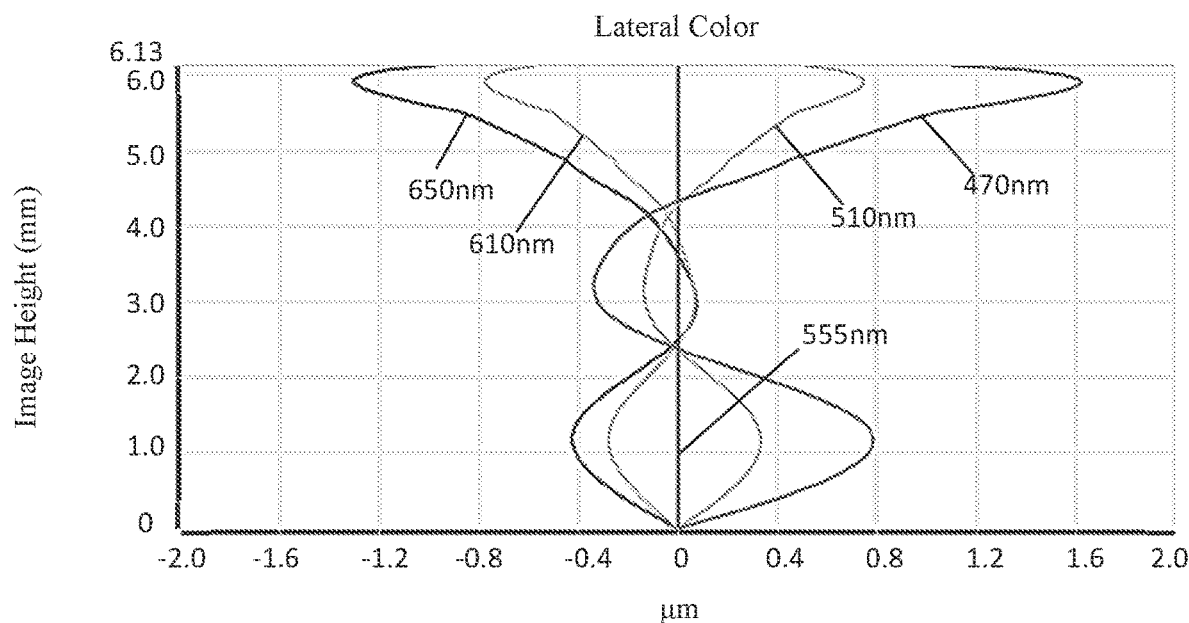
FIG. 15 is a schematic diagram of a lateral color of the camera optical lens shown in FIG. 13.
Figure 16:
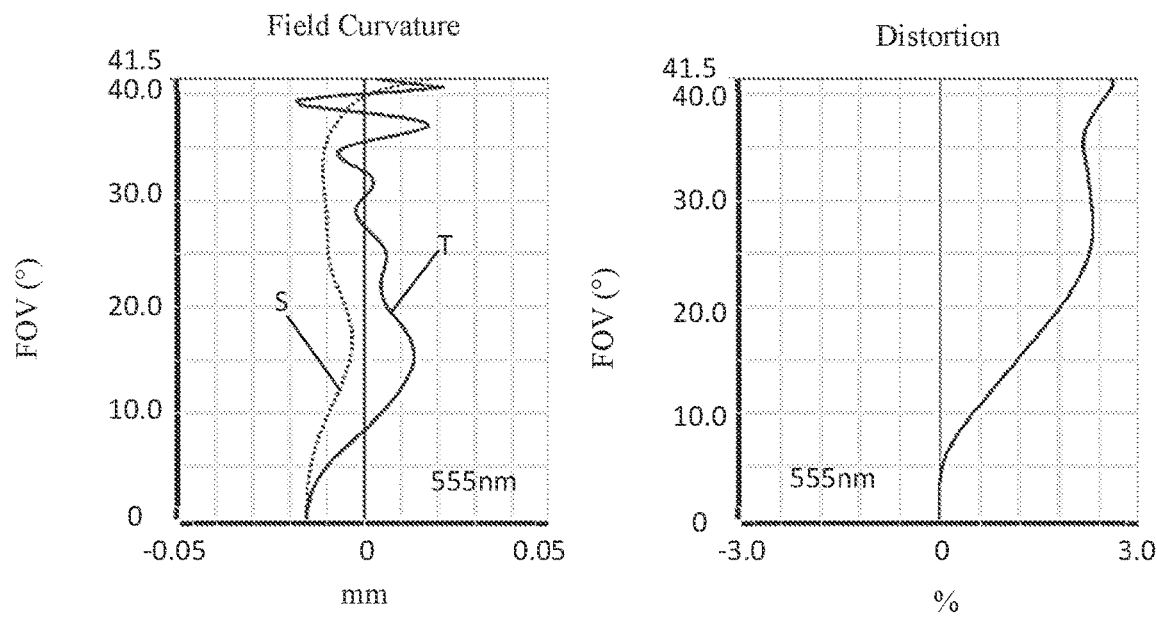
FIG. 16 is a schematic diagram of a field curvature and a distortion of the camera optical lens shown in FIG. 13.

FIG. 14 and FIG. 15 illustrate a longitudinal aberration and a lateral color of light with wavelengths of 650 nm, 610 nm, 555 nm, 510 nm, and 470 nm after passing the camera optical lens 40 according to Embodiment 4. FIG. 16 illustrates field curvature and distortion of light with a wavelength of 555 nm after passing the camera optical lens 40 according to Embodiment 4.

Table 17 below further lists various values and values corresponding to parameters which are specified in the above conditions for the present embodiment. It can be seen that the camera optical lens according to this embodiment satisfies the above conditions.

In this embodiment, the entrance pupil diameter ENPD of the camera optical lens is 4.543 mm. The full field of view image height IH is 6.129 mm. The field of view (FOV) along a diagonal direction is 83.00°. Thus, the camera optical lens 40 satisfies design requirements of ultra-thinness, a large aperture, a wide angle while having on-axis and off-axis aberrations sufficiently corrected, thereby leading to excellent optical characteristics.

TABLE 17

| Parameters and Conditions | Embodiment 1 | Embodiment 2 | Embodiment 3 | Embodiment 4 |
| --- | --- | --- | --- | --- |
| v1 | 60.08 | 74.64 | 81.65 | 74.64 |
| R12/R11 | 3.03 | 6.60 | 10.00 | 3.35 |
| f | 6.229 | 6.637 | 6.139 | 6.724 |
| f1 | 7.268 | 7.741 | 7.675 | 7.852 |
| f2 | −49.174 | −40.733 | −62.072 | −52.036 |
| f3 | −26.060 | −23.976 | −31.747 | −25.431 |
| f4 | 21.616 | 9.969 | 36.756 | 16.845 |
| f5 | −11.196 | 200479.700 | −24.801 | −22.828 |
| f6 | 5.177 | 17.760 | 6.029 | 7.313 |
| f7 | −6.286 | −4.966 | −5.383 | −4.967 |
| f12 | 8.075 | 9.015 | 8.397 | 8.731 |
| FNO | 1.48 | 1.48 | 1.48 | 1.48 |
| TTL | 7.831 | 8.409 | 8.432 | 8.181 |
| IH | 6.129 | 6.129 | 6.129 | 6.129 |
| FOV | 80.00° | 80.00° | 80.00° | 83.00° |

It can be appreciated by one having ordinary skill in the art that the description above is only embodiments of the present invention. In practice, one having ordinary skill in the art can make various modifications to these embodiments in forms and details without departing from the scope of the present invention.

What is claimed is:

1. A camera optical lens, comprising, from an object side to an image side:
   a first lens having a positive refractive power;
   a second lens having a negative refractive power;
   a third lens having a negative refractive power;
   a fourth lens having a positive refractive power;
   a fifth lens;
   a sixth lens having a positive refractive power; and
   a seventh lens having a negative refractive power,
   wherein an object side surface of the seventh lens is concave at a paraxial position,
   wherein the camera optical lens satisfies following conditions:

$59.00 \leq v1 \leq 82.00$;

$3.00 \leq R12/R11 \leq 10.00$, and $0.04 \leq (R13+R14)/(R13-R14) \leq 0.38$, where
   v1 denotes an abbe number of the first lens;
   R11 denotes a central curvature radius of an object side surface of the sixth lens;
   R12 denotes a central curvature radius of an image side surface of the sixth lens;
   R13 denotes a central curvature radius of an object side surface of the seventh lens; and
   R14 denotes a central curvature radius of an image side surface of the seventh lens.

2. The camera optical lens as described in claim 1, further satisfying a following condition:

$1.20 \leq d4/d5 \leq 5.00$, where
   d4 denotes an on-axis distance from an image side surface of the second lens to an object side surface of the third lens; and
   d5 denotes an on-axis thickness of the third lens.

3. The camera optical lens as described in claim 1, further satisfying a following condition:

$$1.50 \leq f4/f \leq 6.00,$$

where f denotes a focal length of the camera optical lens; and
f4 denotes a focal length of fourth lens.

4. The camera optical lens as described in claim 1, further satisfying following conditions:

$$0.58 \leq f1/f \leq 1.88;$$

$$-4.16 \leq (R1+R2)/(R1-R2) \leq -0.85; \text{ and}$$

$$0.07 \leq d1/TTL \leq 0.23$$

where f denotes a focal length of the camera optical lens;
f1 denotes a focal length of the first lens;
R1 denotes a central curvature radius of an object side surface of the first lens;
R2 denotes a central curvature radius of an image side surface of the first lens;
d1 denotes an on-axis thickness of the first lens; and
TTL denotes a total optical length from the object side surface of the first lens to an image plane of the camera optical lens along an optic axis.

5. The camera optical lens as described in claim 1, further satisfying following conditions:

$$-20.22 \leq f2/f \leq -4.09;$$

$$4.11 \leq (R3+R4)/(R3-R4) \leq 15.97; \text{ and}$$

$$0.02 \leq d3/TTL \leq 0.07,$$

where f denotes a focal length of the camera optical lens;
f2 denotes a focal length of the second lens;
R3 denotes a central curvature radius of an object side surface of the second lens;
R4 denotes a central curvature radius of an image side surface of the second lens;
d3 denotes an on-axis thickness of the second lens; and
TTL denotes a total optical length from an object side surface of the first lens to an image plane of the camera optical lens along an optic axis.

6. The camera optical lens as described in claim 1, further satisfying following conditions:

$$-10.34 \leq f3/f \leq -2.41;$$

$$1.00 \leq (R5+R6)/(R5-R6) \leq 4.05; \text{ and}$$

$$0.01 \leq d5/TTL \leq 0.09,$$

where f denotes a focal length of the camera optical lens;
f3 denotes a focal length of the third lens;
R5 denotes a central curvature radius of an object side surface of the third lens;
R6 denotes a central curvature radius of an image side surface of the third lens;
d5 denotes an on-axis thickness of the third lens; and
TTL denotes a total optical length from an object side surface of the first lens to an image plane of the camera optical lens along an optic axis.

7. The camera optical lens as described in claim 1, further satisfying following conditions:

$$-0.16 \leq (R7+R8)/(R7-R8) \leq 1.44; \text{ and}$$

$$0.05 \leq d7/TTL \leq 0.17,$$

where

R7 denotes a central curvature radius of an object side surface of the fourth lens;
R8 denotes a central curvature radius of an image side surface of the fourth lens;
d7 denotes an on-axis thickness of the fourth lens; and
TTL denotes a total optical length from an object side surface of the first lens to an image plane of the camera optical lens along an optic axis.

8. The camera optical lens as described in claim 1, further satisfying following conditions:

$$-8.08 \leq f5/f \leq 45309.56;$$

$$1.48 \leq (R9+R10)/(R9-R10) \leq 238.85; \text{ and}$$

$$0.02 \leq d9/TTL \leq 0.11$$

where f denotes a focal length of the camera optical lens;
f5 denotes a focal length of the fifth lens;
R9 denotes a central curvature radius of an object side surface of the fifth lens;
R10 denotes a central curvature radius of an image side surface of the fifth lens;
d9 denotes an on-axis thickness of the fifth lens; and
TTL denotes a total optical length from an object side surface of the first lens to an image plane of the camera optical lens along an optic axis.

9. The camera optical lens as described in claim 1, further satisfying following conditions:

$$0.42 \leq f6/f \leq 4.01;$$

$$-3.98 \leq (R11+R12)/(R11-R12) \leq -0.81; \text{ and}$$

$$0.04 \leq d11/TTL \leq 0.15,$$

where f denotes a focal length of the camera optical lens;
f6 denotes a focal length of the sixth lens;
d11 denotes an on-axis thickness of the sixth lens; and
TTL denotes a total optical length from an object side surface of the first lens to an image plane of the camera optical lens along an optic axis.

10. The camera optical lens as described in claim 1, further satisfying following conditions:

$$-2.02 \leq f7/f \leq -0.49;$$

and $$0.01 \leq d13/TTL \leq 0.13,$$

where f denotes a focal length of the camera optical lens;
f7 denotes a focal length of the seventh lens;
d13 denotes an on-axis thickness of the seventh lens; and
TTL denotes a total optical length from an object side surface of the first lens to an image plane of the camera optical lens along an optic axis.

11. The camera optical lens as described in claim 1, wherein the first lens is made of a glass material.

* * * * *